United States Patent
Xu

(10) Patent No.: US 9,708,135 B2
(45) Date of Patent: Jul. 18, 2017

(54) COMPLIANT GRIPPER WITH INTEGRATED POSITION AND GRASPING/INTERACTION FORCE SENSING FOR MICROASSEMBLY

(71) Applicant: UNIVERSITY OF MACAU, Taipa, Macau (CN)

(72) Inventor: Qingsong Xu, Macau (CN)

(73) Assignee: UNIVERSITY OF MACAU, Taipa, Macau (CN)

( * ) Notice: Subject to any disclaimer, the term of this patent is extended or adjusted under 35 U.S.C. 154(b) by 78 days.

(21) Appl. No.: 14/873,844

(22) Filed: Oct. 2, 2015

(65) Prior Publication Data

US 2017/0096305 A1  Apr. 6, 2017

(51) Int. Cl.
| | |
|---|---|
| B25J 7/00 | (2006.01) |
| B65G 47/90 | (2006.01) |
| B25J 15/02 | (2006.01) |
| B25J 13/08 | (2006.01) |

(52) U.S. Cl.
CPC .......... B65G 47/901 (2013.01); B25J 13/085 (2013.01); B25J 13/088 (2013.01); B25J 15/0253 (2013.01)

(58) Field of Classification Search
CPC ........ B65G 47/901; B25J 7/00; B25J 13/0852
USPC ..... 294/99.1, 86.4, 119.1, 213, 907; 901/33, 901/34; 310/300, 309; 438/800; 977/962
See application file for complete search history.

(56) References Cited

U.S. PATENT DOCUMENTS

| | | | | |
|---|---|---|---|---|
| 4,456,293 A | * | 6/1984 | Panissidi | B25J 13/082 294/106 |
| 7,489,143 B2 | * | 2/2009 | Konno | B25J 7/00 269/86 |
| 8,028,567 B2 | * | 10/2011 | Kobayashi | B82Y 35/00 73/105 |
| 8,317,245 B2 | * | 11/2012 | Sun | B81C 99/002 294/213 |
| 8,979,149 B2 | * | 3/2015 | Sun | B25J 7/00 294/86.4 |

(Continued)

OTHER PUBLICATIONS

S. Chowdhury, A. Thakur, P. Svec, C. Wang, W. Losert, and S. K. Gupta, "Automated manipulation of biological cells using gripper formations controlled by optical tweezers," IEEE Trans. Autom. Sci. Eng., vol. 11, No. 2, pp. 338-347, 2014.

(Continued)

*Primary Examiner* — Paul T Chin

(74) *Attorney, Agent, or Firm* — Ladas & Parry LLP

(57) ABSTRACT

A compliant gripper with integrated position and force sensors dedicated to automated micro-assembly tasks. The gripper possesses a larger gripping range with a bidirectional drive, and is capable of detecting grasping force and environmental interaction forces in horizontal and vertical axes. The gripper has a compliant rotary flexure bearing. The gripper further has a compliant mechanism with two-stage stiffness designed to provide force sensing with dual sensitivities in two measuring ranges to accommodate the grasping of objects with different sizes. The dual-sensitivity, dual-range force sensor provides finer and coarser force sensing in a small and large ranges, respectively. Analytical models are derived to predict the grasping range, force sensing sensitivities, and force measuring ranges. These models are verified by conducting finite-element analysis simulations.

18 Claims, 15 Drawing Sheets

(56) References Cited

U.S. PATENT DOCUMENTS

| | | | |
|---|---|---|---|
| 2006/0014196 A1* | 1/2006 | Konno | B25J 15/00 435/6.11 |
| 2008/0307866 A1* | 12/2008 | Hiroki | B25J 7/00 73/105 |
| 2009/0278420 A1* | 11/2009 | Sun | B25J 7/00 310/308 |
| 2013/0229087 A1* | 9/2013 | Hayashi | H02N 1/08 310/300 |
| 2013/0310975 A1* | 11/2013 | Chalvet | B25J 7/00 700/245 |
| 2014/0167432 A1* | 6/2014 | Heriban | B25J 7/00 294/196 |
| 2015/0318799 A1* | 11/2015 | Hirokubo | G05B 11/14 310/300 |

OTHER PUBLICATIONS

D. Kruse, J. T. Wen, and R. J. Radke, "A sensor-based dual-arm telerobotic system," IEEE Trans. Autom. Sci. Eng., vol. 12, No. 1, pp. 4-18, 2015.

F. Beyeler, A. Neild, S. Oberti, D. J. Bell, Y. Sun, J. Dual, and B. J. Nelson, "Monolithically fabricated microgripper with integrated force sensor for manipulating microobjects and biological cells aligned in an ultrasonic field," J. Microelectromech. Syst., vol. 16, No. 1, pp. 7-15, 2007.

M. Rakotondrabe, I. A. Ivan, S. Khadraoui, P. Lutz, and N. Chaillet, "Simultaneous displacement/force self-sensing in piezoelectric actuators and applications to robust control," IEEE/ASME Trans. Mechatron., vol. 20, No. 2, pp. 519-531, Apr. 2015.

D. H. Wang, Q. Yang, and H. M. Doug, "A monolithic compliant piezoelectric-driven microgripper: Design, modeling, and testing," IEEE/ASME Trans. Mechatron., vol. 18, No. 1, pp. 138-147, 2013.

Q. Xu, "Design and smooth position/force switching control of a miniature gripper for automated microhandling," IEEE Trans. Ind. Inform., vol. 10, No. 2, pp. 1023-1032, 2014.

T. McPherson and J. Ueda, "A force and displacement self-sensing piezoelectric MRI-compatible tweezer end effector with an on-site calibration procedure," IEEE/ASME Trans. Mechatron., vol. 19, No. 2, pp. 755-764, Apr. 2014.

A. N. Reddy, N. Maheshwari, D. K. Sahu, and G. K. Ananthasuresh, "Miniature compliant grippers with vision-based force sensing," IEEE Trans. Robot., vol. 26, No. 5, pp. 867-877, 2010.

X. Sun, W. Chen, Y. Tian, S. Fatikow, R. Zhou, J. Zhang, and M. Mikczinski, "A novel flexure-based microgripper with double amplification mechanisms for micro/nano manipulation," Rev. Sci. Instrum., vol. 84, No. 8, p. 085002, 2013.

G.-P. Jung, J.-S. Koh, and K.-J. Cho, "Underactuated adaptive gripper using flexural buckling," IEEE Trans. Robot., vol. 29, No. 6, pp. 1396-1407, Dec. 2013.

H. Chang, H. Zhao, F. Ye, G. Yuan, J. Xie, M. Kraft, and W. Yuan, "A rotary comb-actuated microgripper with a large displacement range," Microsyst. Technol., vol. 20, pp. 119-126, 2014.

B. Piriyanont and S. O. R. Moheimani, "MEMS rotary microgripper with integrated electrothermal force sensor," J. Microelectromech. Syst., vol. 23, No. 6, pp. 1249-1251, 2014.

Q. Xu, "Design and implementation of a novel compliant rotary micropositioning stage driven by linear voice coil motor," Rev. Sci. Instrum., vol. 84, No. 5, p. 055001, 2013.

B. Krijnen and D. M. Brouwer, "Flexures for large stroke electrostatic actuation in MEMS," J. Micromech. Microeng., vol. 24, p. 015006, 2014.

K. Rabenorosoa, C. Clevy, Q. Chen, and P. Lutz, "Study of forces during microassembly tasks using two-sensing-fingers grippers," IEEE/ASME Trans. Mechatron., vol. 17, No. 5, pp. 811-821, 2012.

P. Estevez, J. M. Bank, M. Porta, J. Wei, P. M. Sarro, M. Tichem, and U. Staufer, "6 DOF force and torque sensor for micro-manipulation applications," Sens. Actuator A: Phys., vol. 186, pp. 86-93, 2012.

Ni, A. Bolopion, J. Agnus, R. Benosman, and S. Regnier, "Asynchronous event-based visual shape tracking for stable haptic feedback in microrobotics," IEEE Trans. Robot., vol. 28, No. 5, pp. 1081-1089, Oct. 2012.

K. Kim, X. Liu, Y. Zhang, and Y. Sun, "Nanonewton force-controlled manipulation of biological cells using a monolithic MEMS microgripper with two-axis force feedback," J. Micromech. Microeng., vol. 18, No. 5, p. 055013, 2008.

J. Wei, M. Porta, M. Tichem, and P. M. Sarro, "A contact position detection and interaction force monitoring sensor for micro-assembly applications," in Proc. 15th Int. Conf. on Solid State Sensors, Actuators and Microsystems (Transducers 2009), Denver, USA, 2009, pp. 2385-2388.

Y. K. Yong, A. J. Fleming, and S. O. R. Moheimani, "A novel piezoelectric strain sensor for simultaneous damping and tracking control of a high-speed nanopositioner," IEEE/ASME Trans. Mechatron., vol. 18, No. 3, pp. 1113-1121, Jun. 2013.

Q. Xu, "A novel compliant micropositioning stage with dual ranges and resolutions," Sens. Actuator A: Phys., vol. 205, pp. 6-14, 2014.

M. N. M. Zubir, B. Shirinzadeh, and Y. Tian, "Development of novel hybrid flexure-based microgrippers for precision micro-object manipulation," Rev. Sci. Instrum., vol. 80, p. 065106, 2009.

Q. Xu, "New flexure parallel-kinematic micropositioning system with large workspace," IEEE Trans. Robot., vol. 28, No. 2, pp. 478-491, 2012.

M. A. Cullinan, R. M. Panas, C. M. DiBiasio, and M. L. Culpepper, "Scaling electromechanical sensors down to the nanoscale," Sens. Actuator A: Phys., vol. 187, pp. 162-173, 2012.

K. K. Leang, Y. Shan, S. Song, and K. J. Kim, "Integrated sensing for IPMC actuators using strain gages for underwater applications," IEEE/ASME Trans. Mechatron., vol. 17, No. 2, pp. 345-355, 2012.

J. Dong, S. M. Salapaka, and P. M. Ferreira, "Robust control of a parallel-kinematic nanopositioner," J. Dyn. Sys., Meas., Control, vol. 130, No. 4, p. 041007, 2008.

Q. Xu, "Design, fabrication and testing of a MEMS microgripper with dual-axis force sensor," IEEE Sensors J., doi: 10.1109/JSEN. 2015.2453013, in press.

* cited by examiner

COMPLIANT GRIPPER WITH INTEGRATED POSITION AND GRASPING/INTERACTION FORCE SENSING FOR MICROASSEMBLY

BACKGROUND OF THE INVENTION

Field of the Invention

The present invention generally relates to a robotic gripper for automated pick-and-place operation having extensive applications in micro-manipulation and micro-assembly tasks. More specifically, the present invention relates to a compliant gripper having a larger grasping range and having an integrated dual-sensitivity, dual-range force sensor for the detection of both grasping and interaction forces and having an integrated position sensor for detecting the position of an actuation tip during micro-assembly.

Related Art

Various sensorized grippers with different structures, actuators, and sensors have been proposed for micro-handling applications. For instance, an electrostatically actuated micro-gripper with capacitive type of position and grasping force sensors has been reported. Piezoelectric cantilever-based grippers with tip position and grasping force sensing have been well studied and compliant grippers driven by piezoelectric stack actuators and sensed by strain gauges have been developed. Also, compliant grippers with self-sensing capability have been recently developed.

Compliant mechanisms deliver attractive merits in terms of no clearance, no friction, no wear, no need for lubrication, and ease of manufacture. Hence, they have been widely employed in micro-handling applications.

Depending on targeted applications, compliant grippers can be fabricated in macro-, meso-, and micro-scales. Both linear and rotary guiding approaches have been proposed in gripper structure design. For example, a macro-scale flexure-based gripper with linear guiding and double displacement amplifications has been proposed which can provide a maximum gripping range of 134 µm. A meso-scale buckling compliant gripper using simple rotary guiding has been devised to achieve a wide gripping range and a narrow range of force variation for small-scale application. In addition, a micro-scale MEMS gripper with rotary guiding has been developed which delivers a gripping range of 94 µm, and more recently, a MEMS rotary gripper with both arms actuated by rotary comb-drives and sensed by electro-thermal sensors was reported as providing a gripping range of 90 µm.

However, a majority of the existing compliant grippers can only deliver a limited range of gripping (less than 1 mm, typically).

To adapt to the gripping of objects of various sizes, it is desirable to design a gripper with large gripping range so as to facilitate a wider application. However, it has been challenging to create a gripper with a large gripping range while maintaining the overall dimensions of the gripper as compact as possible.

In addition to the above deficiency, gripper arms are generally only able to provide a unidirectional gripping motion. For example, in a normally open gripper, the gripper arms are usually actuated to close the gripper tips (in positive direction) while the open operation (in negative direction) is realized by the restoring force provided by flexural mechanisms. However, in practice, the unidirectional gripping range is limited by the allowable maximum stress of the material. Hence, the capability of drive in both positive and negative directions allows the generation of a double-stroke over the unidirectional drive for the same mechanical design.

For instance, if a bidirectional actuation flexure gripper designed to provide an operation range of D holds the same operation range D using a unidirectional actuation, the flexures should be designed to have longer lengths which lead to a larger dimension of the gripper mechanism. Thus, the bidirectional actuation is necessary to generate a contact structure design for the gripper. However, few grippers have been reported to provide the drive in both close and open operation of the gripper tips. One reason is that majority of actuators can only provide a one-way drive, e.g., the aforementioned electrostatic actuators, piezoelectric stack actuators, etc. To implement the drive in both positive and negative directions, two actuators can be adopted. However, this complicates the gripper design and increases the hardware costs.

Moreover, to realize an accurate and reliable grasp operation, position and force sensing are crucial. When the gripper arms are closed to grasp an object, the gripping force sensing is important to guarantee that an appropriate force is exerted on the object. The reason lies in that a small force is not sufficient to grasp the object firmly while a large force may incur damage to the object. In addition, to ensure a reliable operation, it is also essential to detect the interaction force exerted by environment. Detection of an interaction force is important to determine whether the gripper contacts the environment and to ensure the safety of the gripper device by avoiding excessive interaction. Most existing grippers can only sense gripping force in the gripping direction whereas few grippers can sense interaction forces in other directions.

In related art, computer vision has been employed to detect contact force. However, the limited view of a microscope restricts its wide application. To overcome this problem, a thermally actuated gripper with capacitive type of grasping and interaction force sensors has been proposed where two force sensors are used to detect the grasping force and interaction force along two perpendicular directions, respectively. In addition, a miniature gripper with a piezoresistive sensor for the measurement of contact position and magnitude of a perpendicular external interaction force has been developed. However, these grippers require separate force sensors for sensing the grasping and interaction forces. This complicates the design of the gripper structure and increases hardware costs. The reason for using two force sensors mainly arises from the fact that, generally, a force sensor can only measure force in a single direction. In view of the forgoing, it has been challenging to devise a force sensor for the detection of the applied forces in two or three perpendicular directions.

In addition, the sensitivity and measurement range of a sensor often conflict with one another: improving sensitivity often decreases the measurement range while increasing the measurement range often decreases sensitivity. Thus, it has been difficult to develop a force sensor exhibiting high sensitivity while simultaneously having a large measurement range.

SUMMARY OF THE INVENTION

To overcome the deficiencies in the prior art and to accommodate the grasping of objects having a wide range of sizes, the present invention uses a two-stage force sensor. Such a force sensor enables the gripper to have a high-sensitivity sensing in a smaller range and a low-sensitivity sensing in a larger range for executing different gripping tasks.

In accordance with the invention, there is provided a gripper assembly comprising:

(a) an actuation arm comprising an actuation arm tip;
(b) a sensing arm comprising a sensing arm tip;
(c) a rotary actuation arm flexure bearing operatively connected to the actuation arm;
(d) an actuation arm guiding flexure operatively connected to the actuation arm bearing;
(e) driving means for imparting a driving displacement along a y-axis direction to the actuation arm bearing through the actuation arm guiding flexure, the actuation arm flexure bearing being configured to convert the driving displacement in the y-axis direction into motion of the actuation tip in an x-axis direction;
(f) a rotary sensing arm flexure bearing operatively connected to the sensing arm and being configured to convert displacement of the sensing arm tip in the x-axis direction into displacement in the y-axis direction; and
(g) first and second force sensor flexures operatively linked to the rotary sensing arm flexure bearing in series and being configured to detect y-axis displacement of the sensing arm tip caused both by contact of the sensing arm tip with environment and by conversion of x-axis displacement of the sensing arm tip by the rotary sensing arm flexure bearing whereby the first and second force sensor flexures can collectively detect both a grasping force $F_g$ of the gripper and an interaction force $F_e$ caused by the gripper interacting with the environment, wherein the first force sensor flexure has a lower stiffness than the second force sensor flexure and a measuring range that is smaller than that of the second force sensor flexure such that the first force sensor flexure can measure an initial displacement of the sensing arm tip in a lower measuring range with a first sensitivity and the second force sensor flexure assembly can measure a further displacement of the sensing arm tip in a larger measuring range with a second sensitivity that is lower than the first sensitivity.

The dual-sensitivity, dual-range force sensor is designed for measuring grasping forces and also interaction forces resulting from a gripper tip interacting with the environment around the gripper. Moreover, the sensing of two-directional forces (for example, grasping and interaction forces that are perpendicular to one another) using one force sensor can be achieved by the novel design of the gripper structure.

In a preferred embodiment, the gripper structure uses a compliant mechanism having parallelogram flexures connected in series and having two-stage stiffness for dual-sensitivity and dual-range force sensing. The parallelogram flexures are connected to a force sensing gripper arm through a compliant rotary bearing. By this way, the grasping and interaction forces applied to the force sensing gripper arm are detected sequentially by the parallelogram flexures. Thus, before grasping an object, the parallelogram flexures act as an interaction force sensor for detecting contact with the environment around the gripper. Afterwards, the same parallelogram flexures function as a grasping force sensor for measuring the grasping force of the gripper tips.

In another preferred embodiment, the present invention provides a compliant gripper having a compact structure while having a larger gripping range for executing pick-and-place operation during micro-assembly tasks involving objects having sizes ranging, for example, from approximately 0.15 to 4 mm. In a preferred embodiment, the compliant gripper structure according to the present invention uses compound parallelogram flexures and compound radial flexures for generating a large-range linear and rotary guiding, respectively.

The compound radial flexures transfer a y-axis bidirectional displacement from an electromagnetic actuator into an x-axis motion for exertion by an actuation gripper tip. The compound radial flexures enable a compact design for the gripper structure while delivering a much larger rotary grasping range. The new structure for the compliant gripper of the present invention enables a larger gripping range of over 4 mm for one gripper tip.

According to another aspect of the present invention, the compliant gripper uses an integrated position sensor for measuring the position of a gripper tip during micro-assembly. The compound radial flexures are driven by an electromagnetic actuator which provides a linear bidirectional displacement. A linear actuator guiding mechanism having position flexures is connected to the electromagnetic actuator and a strain gauge position sensor is connected to the position flexures of the actuator guiding mechanism. Thus, the strain gauge position sensor is configured to measure the position of the actuator tip of the gripper during micro-assembly tasks.

In view of the foregoing, the present invention provides a robotic gripper for micro-manipulation and micro-assembly tasks having a structure comprising an actuation tip and a force-sensing tip, each connected to a compliant rotary arm bearing having, for example, compound radial flexures. In a preferred embodiment, the structure of the compliant gripper has a compliant rotary actuation arm bearing driven by a voice coil motor that is configured to translate a linear displacement from the voice coil motor into a perpendicular grasping motion Fg exerted by the actuation tip. A compliant rotary sensing arm bearing is configured to translate the perpendicular grasping motion Fg exerted by the actuation tip onto the force-sensing tip into a linear displacement. The structure of the compliant gripper further includes a compliant mechanism with two-stage stiffness connected to the sensing arm bearing and having a first group of force flexures and a second group of force flexures connected in series. A first force sensor is connected to the first group of force flexures, and a second force sensor is connected to the second group of force flexures. The first and second force sensors are used for measuring the grasping and interaction forces exerted onto the force-sensing tip of the compliant gripper.

In another embodiment of the present invention, the compliant gripper further comprises a linear actuator guiding mechanism having position flexures, and a strain gauge position sensor connected to the position flexures of the actuator guiding mechanism. In this embodiment, the position of the actuator tip is measured by the strain gauge position sensor attached onto the position flexures of the actuator guiding mechanism.

In one embodiment of the present invention, the force-sensing tip is longer than the actuation tip.

Further embodiments of the present invention have flexures that are right circular, right angle, corner-filled, elliptical, or leaf flexures. In one embodiment, the flexures are leaf flexures.

In an embodiment of the present invention, the first and second groups of force flexures are configured to detect both the grasping force Fg and an interaction force Fe caused by the gripper interacting with the gripper's environment.

In another embodiment, the actuation arm of the compliant gripper is driven in a tangential direction by the voice coil motor.

In another embodiment of the present invention, the first group of force flexures comprises four fixed-guided force flexures which experience identical deformation due to having the same dimensions, and the second group of force flexures comprises two compound parallelogram force flexures. The first and second force sensors are strain gauges attached onto the first and second groups of force flexures, respectively. More specifically, the first force sensor is a piezoresistive strain gauge and the second force sensor is a metal strain gauge.

In a further embodiment of the present invention, the first group of force flexures has a lower stiffness than the second group of force flexures thereby making the first force sensor exhibit a higher sensitivity than the second force sensor. More specifically, the translation by the first group of force flexures is stopped by a first mechanical stopper and the translation by the second group of force flexures is stopped by a second mechanical stopper thereby providing a two-stage sensing scheme with the first force sensor having a higher sensitivity in a smaller force measurement range, and the second force sensor having a lower sensitivity in a larger force measurement range. The smaller force measurement range [0, F1], deformation is experienced by both the first and second groups of force flexures, and in the larger force measurement range [F1, F2], flexure deformation is experience by only the second group of force flexures of the second force sensor. More specifically, the first force sensor has a finer resolution of 0.314 mN within the smaller force measurement range of [0, 138.3 mN] and the second force sensor has a coarser resolution of 20.512 mN in the larger force measurement range of [0, 815.2 mN].

In an embodiment of the present invention, the grasping range of the actuation tip is approximately 0.0-4.4 mm.

In another embodiment, the robotic gripper is made from Al-7075 alloy material using a wire-electrical discharge machining process.

A further embodiment of the present invention comprises a method which may include the following steps for a pick-and-place operation: moving the gripper in a negative z-axis direction at a constant velocity, actuating the gripper to grasp an object, moving the gripper upward along a positive z-axis direction to pick-up the object, moving the gripper in a positive x-axis direction at a constant velocity to transport the object above a desired location, lowering the gripper along the negative z-axis direction, releasing the object on the desired location, moving the gripper upward along the positive z-axis direction, and returning the gripper to a home position by moving the gripper along a negative x-axis direction.

Further features and advantages of the present invention as well as the structure and operation of various embodiments of the present invention are described in detail below with reference to the accompanying drawings.

The present invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

Figure 1:
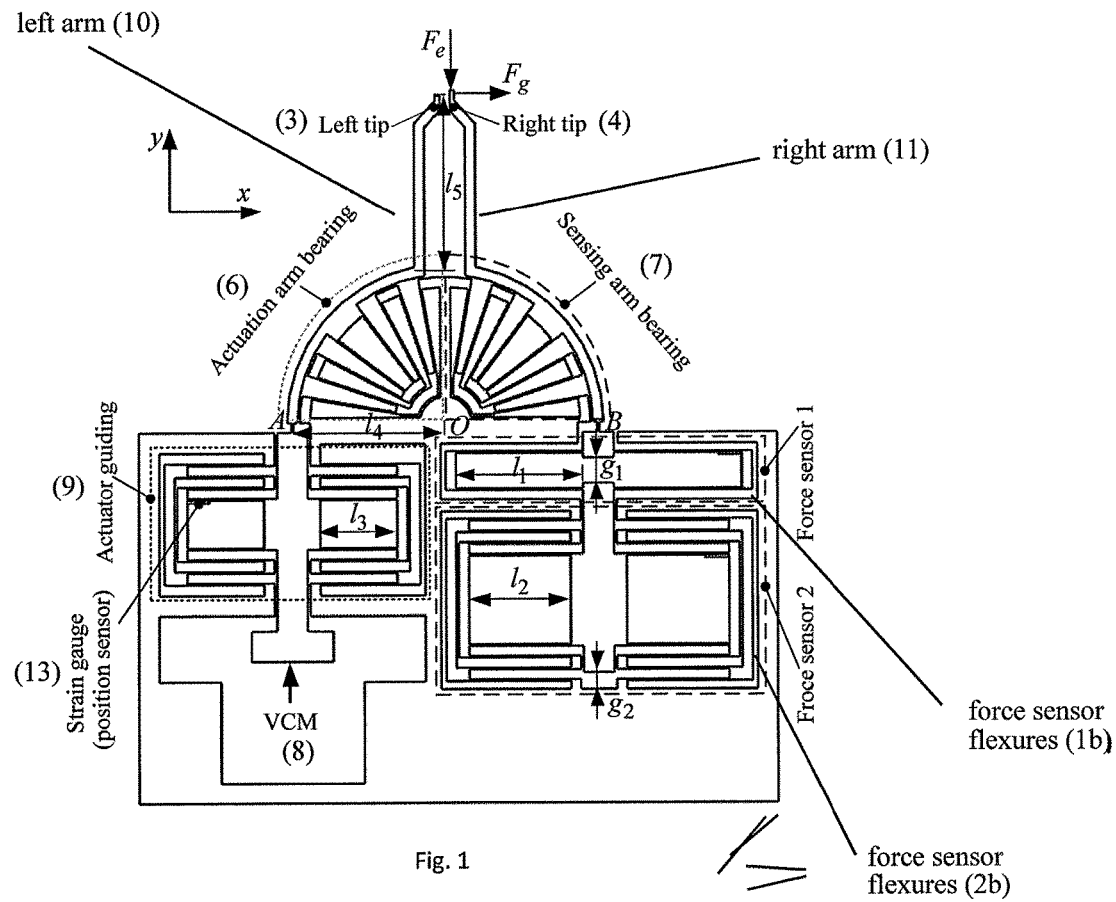
FIG. 1 shows a schematic view of an embodiment of the compliant gripper.

The mechanical structure of an embodiment of the compliant gripper is shown in FIG. 1. The compliant gripper comprises an actuation left tip (3) and a force-sensing right tip (4). Each tip is connected to a rotary arm bearing. An actuation arm bearing (6) is driven by a voice coil motor (VCM) (8) through a linear actuator guiding mechanism (9). A sensing arm bearing (7) is linked to two groups of force sensor flexures (1b, 2b) and the groups of sensor flexures are connected in series. As a result, a relatively compact structure for the gripper is obtained.

Referring to the coordinate system as assigned in FIG. 1, the role of the actuation arm bearing (6) is to convert the driving displacement from the VCM (8) in the y-axis direction into the grasping motion of the left tip (3) in the x-axis direction. Similarly, the role of the sensing arm bearing (7) is to transmit the x-axis motion of the right tip (4) into the y-axis translation of the force sensor flexures (1b, 2b) (see also FIG. 5b). By this way, the grasping force $F_g$ is measured by the force sensor flexures (1b, 2b).

The right tip (4) is slightly longer than the left tip (3). Hence, when the gripper interacts with the environment in y-axis direction, contact is established with the right tip (4) first. The interaction force $F_e$ causes a y-axis motion of the right tip (4), which is transferred to the force sensor flexures (1b, 2b) as well (see also FIG. 5c). Therefore, both the grasping and interaction forces can be detected by the force sensor flexures (1b, 2b).

Figure 3:
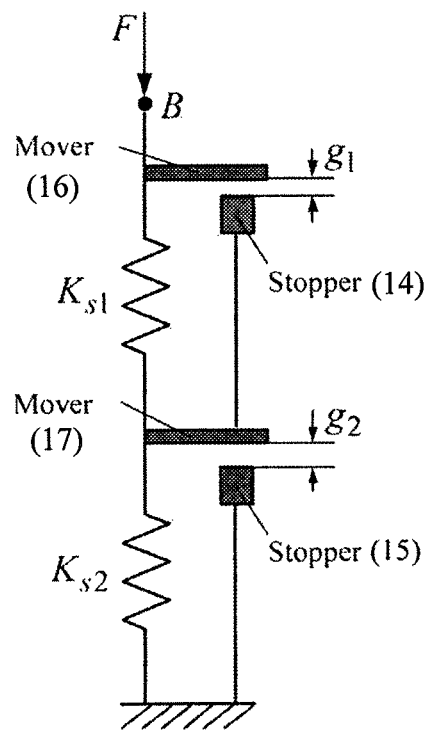
FIG. 3 shows a schematic of a force sensing scheme of the right gripper tip in an embodiment of the compliant gripper.
Figure 4:
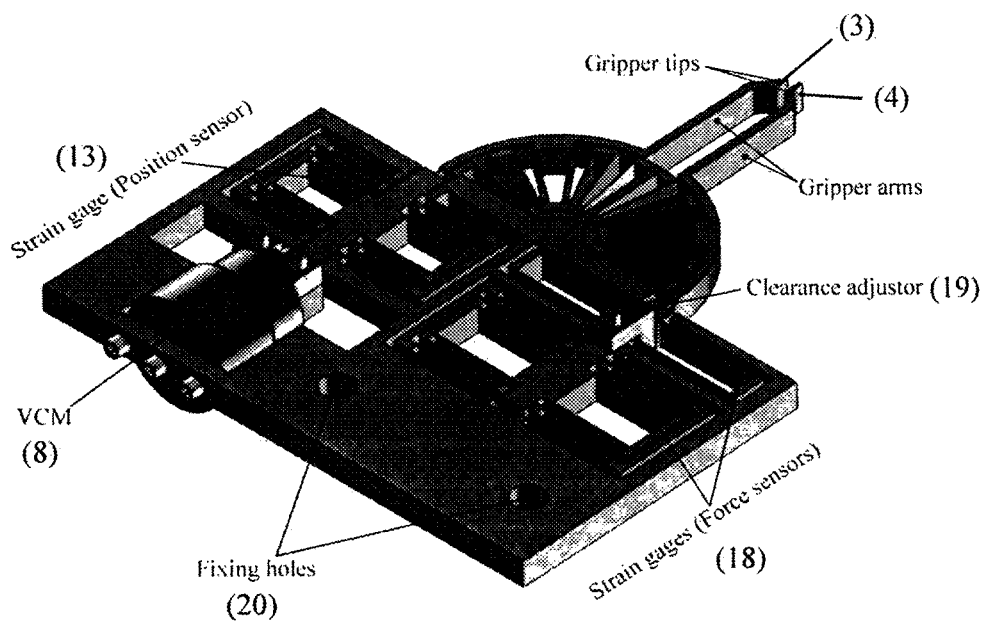
FIG. 4 shows a CAD model of an embodiment of the compliant gripper driven by a voice coil motor (VCM).

Referring to FIG. 4, the clearance adjuster (19) exhibits an "L" shape. One edge is fixed on the top of mover (17) using a screw, and the other edge acts as the stopper (14) as illustrated in FIG. 3. The clearance $g_1$ is adjusted by changing the position of stopper (14) before fixing the adjuster using the screw. The fixing holes (20) are used to mount the gripper to a micromanipulator.

The gripper tip does not deliver pure translational motion because it is guided by a rotary bearing flexure. To achieve a grasping range of several hundred to thousand micrometers, the slight rotation of gripper tips is not a critical issue as it is negligible.

The flexure-based compliant mechanism of the gripper can be designed using different shapes of hinges, for example, right circular, right angle, corner-filled, and elliptical hinges. These different shapes of hinges exhibit different properties. In an embodiment of the present invention, leaf flexures are employed to yield a large elastic deformation.

Actuation Issues
Driving Displacement Requirement

To obtain a large grasping range, a VCM (8) is used to drive the left arm (10) of the gripper. Referring to FIG. 1, the rotary actuation arm bearing (6) of the actuation left arm (10) is driven in the tangential direction by the VCM (8) through a linear actuator guiding (9). The relationship between the displacement in the x direction of the left tip (3) and the VCM (8) linear driving displacement $d_{in}$ in the y direction is approximated by:

$$\frac{x}{d_m} = \frac{l_4 + l_5}{l_4} \quad (1)$$

where $l_4$ is the driving distance between the driving point A and the rotation center O of the rotary bearing, and $l_5$ is the length of the left arm (10), as shown in FIG. 1.

Specifying a grasping displacement x of the gripper, the required driving displacement $d_{in}$ from the VCM motor (8) can be derived from equation (1) as follows:

$$d_m = \frac{l_4 x}{l_4 + l_5} \quad (2)$$

Driving Force Requirement

Given the driving displacement $d_{in}$, the required driving force $F_{in}$ from the VCM (8) can be determined by calculating the left portion stiffness $K_l$ of the gripper.

The spring constant of the compound parallelogram flexure can be derived as follows:

$$K_1 = \frac{Ebh^3}{l_3^3} \quad (3)$$

where E is Young's modulus, b is the thickness of the material, h is the in-plane width, and $l_3$ is length of the leaf flexures.

Figure 2:
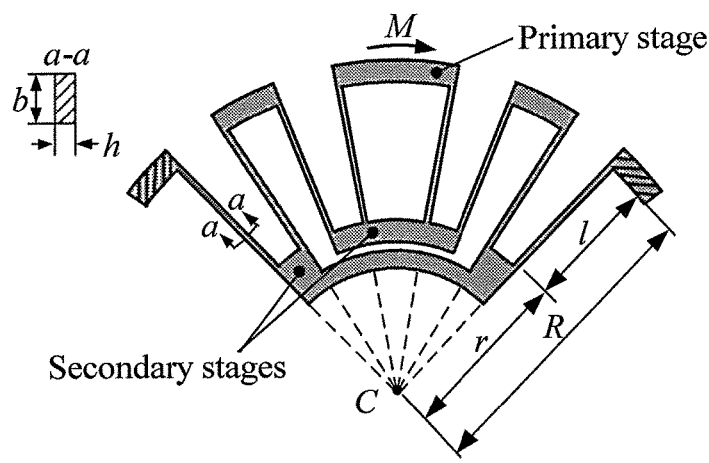
FIG. 2 shows a rotary flexure bearing of the actuation and sensing arms in an embodiment of the compliant gripper.

In addition, the rotary flexure bearing is a compound radial flexure mechanism, which is composed of two basic modules. The torsional spring constant can be calculated as:

$$K_t = \frac{Ebh^3 Rr}{2l^3} \quad (4)$$

where the length l, radii R and r of the leaf flexures (12) are denoted in FIG. 2.

Assuming that the tangential driving force F produces an angle θ of the rotary bearing, the torsional stiffness can be expressed as follows:

$$K_t = \frac{Fl_4}{\theta} \quad (5)$$

where the rotary angle θ of the bearing induces a translation d of the driving point A, which can be approximated by:

$$d = l_4 \theta \quad (6)$$

Therefore, in view of the equations of (4), (5), and (6), the equivalent linear stiffness at the driving point A can be derived as:

$$K_2 = \frac{F}{d} = \frac{K_t}{l_4^2} = \frac{Ebh^3 Rr}{2l^3 l_4^2} \quad (7)$$

Considering that the spring constants $K_1$ and $K_2$ are connected in parallel because both are fixed at the base, the equivalent stiffness of the left portion of the gripper can be computed as follows:

$$K_l = K_1 + K_2 = Ebh^3 \left( \frac{1}{l_3^3} + \frac{Rr}{2l^3 l_4^2} \right) \quad (8)$$

which is derived in view of equations (3) and (7).

Hence, the required driving force from the VCM motor (8) can be obtained as follows:

$$F_{in} = K_l d_{in} = Ebh^3 \left( \frac{1}{l_3^3} + \frac{Rr}{2l^3 l_4^2} \right) d_{in} \quad (9)$$

Stress Constraint

To make sure that the linear actuator guiding flexure (9) works in the elastic condition, its displacement should stay lower than the maximum translation which is restricted by the yield stress—the maximum allowable stress of the material.

The maximum one-sided translation of this compound parallelogram flexure can be calculated by:

$$d_{max1} = \frac{2\sigma_y l_3^2}{3Eh} \quad (10)$$

where $\sigma_y$ is the yield stress of the material.

Thus, the driving displacement should meet the condition:

$$d_{in} \leq d_{max1} = \frac{2\sigma_y l_3^2}{3Eh} \quad (11)$$

to guarantee that no plastic deformation occurs for the linear actuator guiding flexure (9).

In addition, the maximum one-sided rotary angle of the rotary flexure can be derived as:

$$\theta_{max} = \frac{2\sigma_y l^2 (R+r)}{3ERrh} \quad (12)$$

To ensure that the rotary bearing works in elastic deformation, the driving displacement should also satisfy the following condition:

$$d_{in} \leq d_{max2} = l_4 \theta_{max} = \frac{2\sigma_y l^2 l_4 (R+r)}{3ERrh} \quad (13)$$

Position and Force Sensing Issues

The position of the left tip (3) is measured by a strain gauge-based displacement sensor (13) glued onto the surface of leaf flexures connected to the actuator guiding mechanism (9).

The force $F_g$ for grasping the object or the force $F_e$ of interaction with environment is exerted on the right tip (4) which is then transmitted to the force sensor flexures (1*b*, 2*b*) in the right portion of the gripper structure. More specifically, a force sensor (1) is composed of four fixed-guided flexures (1*b*) which experience identical deformation due to having the same dimensions. A force sensor (2) consists of two compound parallelogram flexures (2*b*). By adopting strain gauges (18) attached onto the flexures (1*b*, 2*b*), the force experienced by the right tip (4) can be measured.

Sensor Sensitivity Design

According to Hooke's law, the force experienced by the force sensor flexures (1*b*, 2*b*) can be obtained as follows:

$$F_1 = K_{s1} y_1 \quad (14)$$

$$F_2 = K_{s2} y_2 \quad (15)$$

with $$K_{s1} = \frac{Ebh_1^3}{l_1^3} \quad (16)$$

$$K_{s2} = \frac{Ebh_2^3}{l_2^3} \quad (17)$$

where $l_1$ and $h_1$ are the length and width of the flexures (1b) related to force sensor (1), and $l_2$ and $h_2$ are the length and width of the flexures (2b) related to force sensor (2), respectively. In addition, $y_1$ and $y_2$ are the displacements of the force sensor flexures (1b) and (2b), respectively.

As shown in FIG. 3, when the force sensor flexures (1b, 2b) are connected in series, they suffer from the same force, i.e., $F_1=F_2$. Equations (14) and (15) provide that the smaller the stiffness is, the larger the displacement will be. Thus, a larger displacement induces a larger strain of the strain gauges (18) connected to the force sensor flexures (1b, 2b), producing a higher magnitude of output signal. This allows for a higher sensing sensitivity to be obtained.

The sensor flexures (1b) of the first force sensor (1) are designed to have a lower stiffness than that of the sensor flexures (2b) of the second force sensor (2). Therefore, sensor (1) exhibits a higher sensitivity than sensor (2). In addition, sensor (1) is designed to have a smaller measurement range which is constrained by a mechanical stopper (14). That is, after experiencing a certain magnitude of applied force, the translation of the sensor flexure (1b) is stopped by stopper (14) which is mounted between the structures of the sensors (1, 2), as shown in FIG. 3. In contrast to sensor (1), sensor (2) has a lower sensitivity in a larger measuring range constrained by stopper (15). Thus, a two-stage sensing scheme is designed whereby sensor (1) is suitable to detect the initial contact of the gripper with the grasped object or environment with a finer resolution, and sensor (2) is able to measure the force after contact in a larger measuring range. In view of the forgoing, the sensors (1, 2) are responsible for measuring the grasp forces of smaller and larger objects in the two measuring ranges, respectively.

The output signal of the strain gauges (18) connected to the sensor flexures (1b, 2b) is conditioned using a quarter Wheatstone-bridge circuit. The output voltage of the circuit is approximated as:

$$V = \frac{V_s}{4R} \times \Delta R \quad (18)$$

where $V_s$ is the excitation voltage, R is the nominal resistance, and $\Delta R$ is the resistance change value of the strain gauge.

The relationships between the displacements ($y_1$, $y_2$) of the two sensors (1, 2) and the circuit output voltages ($V_1$, $V_2$) can be established as follows:

$$y_1 = \frac{8 l_1^2 V_1}{3 h_1 S_1 V_s} \quad (19)$$

$$y_2 = \frac{16 l_2^2 V_2}{3 h_2 S_2 V_s} \quad (20)$$

where $S_1$ and $S_2$ are the gauge factors of the strain gauges (18) of the force sensors (1) and (2), respectively.

In view of equations (14)-(20) and the relation of $F_1=F_2$, the ratio of the sensitivities of the two strain gauges can be generated as $$\eta = \frac{V_1/F_1}{V_2/F} = \frac{V_1}{V_2} = \frac{2 S_1 h_2^2 l_1}{S_2 h_1^2 l_2} \quad (21)$$

Measuring Range Design

From the foregoing analysis, it is observed that in the smaller force measuring range [0, $F_1$], the deformation is experienced by both sensor flexures (1b, 2b). Whereas in the larger force range [$F_1$, $F_2$], the deformation of the sensing flexures (1b, 2b) is attributed to sensor (2) alone.

In the smaller range of [0, $F_1$], considering the serial connection of the equivalent linear springs, the overall stiffness $K_{R1}$ of the sensing system can be derived below:

$$K_{R1} = \frac{1}{\frac{1}{K_{s1}} + \frac{1}{K_{s2}}} = \frac{E b h_1^3 h_2^3}{h_1^3 l_2^3 + h_2^3 l_1^3} \quad (22)$$

Once a particular displacement S1 of the sensing point B is caused by the corresponding force F1, a mover (16) translates a displacement g1 relative to stopper (14) and contacts it. At this moment, the driving force can be expressed as follows:

$$F1 = K_{R1} S1 = K_{s1} g_1 \quad (23)$$

where the clearance $g_1$ is shown in FIG. 3. The clearance can be adjusted by tuning the clearance adjuster (19) shown in FIG. 4. The displacement stroke S1 can be determined from equation (23).

In view of equations (16) and (23), the first force range F1 can be derived as:

$$F1 = \frac{E b h_1^3 g_1}{l_1^3} \quad (24)$$

If the force is continually applied, the sensor flexure (1b) will not be deformed anymore because it has been already restricted by the stopper (14). Under such situation, the force condition of the flexures (1b) associated to force sensor (1) will not change any more. The force cannot be measured by force sensor (1) because it is saturated. This means that the derived stiffness equation (22) is invalid to estimate the experienced force due to the saturation. The force is only measured by force sensor (2) because its flexures (2b) suffer from further deformations. Thus, the force can be considered to be applied to sensor flexure (2b) alone. As a result, the overall stiffness in the larger measuring range is:

$$K_{R2} = K_{s2} \quad (25)$$

When the mover (17) contacts the stopper (15), the force sensor (2) is saturated, and no more sensor flexures (2b) will be deformed. The extreme of the second force range F2 can be determined by:

$$F2 = K_{R2} g_2 \quad (26)$$

Thus, the extreme of the second measuring range F2 is derived as follows:

$$F2 = \frac{E b h_2^3 g_2}{l_2^3} \quad (27)$$

The smaller and larger sensing ranges of the force sensors (1, 2) are governed by equations (24) and (27), respectively. Given a material with Young's modulus E, the sensing ranges can be designed by selecting appropriate parameters (b, $h_1$, $h_2$, $l_1$, $l_2$, $g_1$, and $g_2$). The clearances $g_1$ and $g_2$ are much smaller than the maximum displacements of the sensor flexures (1b) and (2b), respectively. In addition, the induced displacement of the sensing point B does not cause plastic deformation of the sensing-arm rotary bearing (7).

Example Embodiment of the Compliant Gripper

As an example of an embodiment of the present invention, a gripper was designed using a piece of Al-7075 alloy material. A CAD model is illustrated in FIG. 4 and the main structural parameters are shown in Table I. An objective of this embodiment was to achieve a large grasping range of [0, 4.4 min] between the two gripper tips (3, 4).

TABLE 1

Main parameters of a Compliant Gripper.

| Parameter | Value | Unit |
|---|---|---|
| R | 26.5 | mm |
| r | 10.0 | mm |
| l | 16.5 | mm |
| $l_1$ | 25.0 | mm |
| $l_2$ | 20.0 | mm |
| $l_3$ | 15.0 | mm |
| $l_4$ | 30.0 | mm |
| $l_5$ | 35.0 | mm |
| $h_1$ | 0.3 | mm |
| $h_2$ | 0.3 | mm |
| h | 0.3 | mm |
| b | 6.35 | mm |
| $g_1$ | 0.2 | mm |
| $g_2$ | 0.5 | mm |

In order to generate a grasping displacement of ±2.2 mm for the left tip (3), the required input displacement from the VCM motor (8) is calculated by equation (2) as ±1.0 mm which needs an actuation force of 4.11 N. The driving displacement is much lower than the one-sided allowable translations of $d_{max1}$=3.5 mm and $d_{max2}$=17.5 mm, as evaluated by equations (11) and (13), respectively.

In regard to the force sensor, a piezoresistive and a metal strain gauge are attached to the sensor flexures (1b) and (2b), respectively. Assume that the gauge factors for the two strain gauges are $S_1$=130 and $S_2$=2.1, respectively. Using equation (21), the ratio of the two sensitivities is calculated as η=154.76. In addition, based on equations (24) and (27), the two force measuring ranges are evaluated as [0, 0.1573 N] and [0.1573 N, 0.7683 N], respectively.

To verify the performance of the stage, PEA simulations were carried out using the ANSYS software package.

Performance of Actuation Arm

Figure 5A:
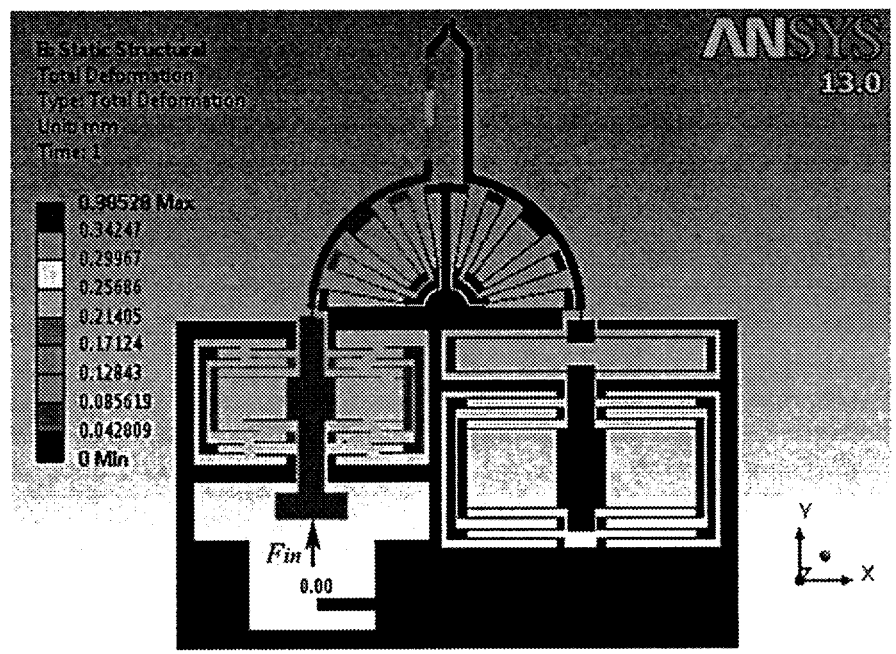
FIG. 5(a) shows deformation results of static structural FEA simulation when an actuation force is applied to an embodiment of the compliant gripper.

The static performance of the example gripper was evaluated using static structural FEA. The simulations were conducted by applying an input force (1 N) to the input end of the left arm of the gripper. The induced overall deformation of the gripper is shown in FIG. 5(a).

To produce a grasping displacement of ±2.2 mm, simulation results indicate that the required driving displacement is ±1.07 mm and the needed maximum driving force is 5.71 N from the motor. Taking the FEA simulation results as benchmarks, it was observed that the analytical models underestimate the required driving displacement and force by 6.5% and 28.0%, respectively. The discrepancies are mainly induced by the assumption used in analytical models, where only the bending deformations of the flexures related to linear and rotary bearings are considered. More accurate results can be produced by establishing analytical models in consideration of the deformations of the entire compliant mechanism.

FEA simulation revealed that the maximum stress occurs around the flexure at the driving point A. To produce the required grasping range of ±2.2 mm for the left tip (3), the induced maximum stress is only 34.6 MPa which is far less than the yield stress (503 MPa) of the material. Thus, the elastic deformation of the material is well-guaranteed by the designed parameters as shown in Table I.

In addition, for producing the full gripping range of ±2.2 mm, FEA results show that the induced rotational angle of the gripper tip is ±1.76°. For creating a smaller gripping range of ±0.50 mm, the rotational angle of the gripper tip is only ±0.40°. Hence, the slight rotation of the gripper tip will not matter a lot to the grasping process and can be neglected.

Performance of Sensing Arm

Figure 5B:
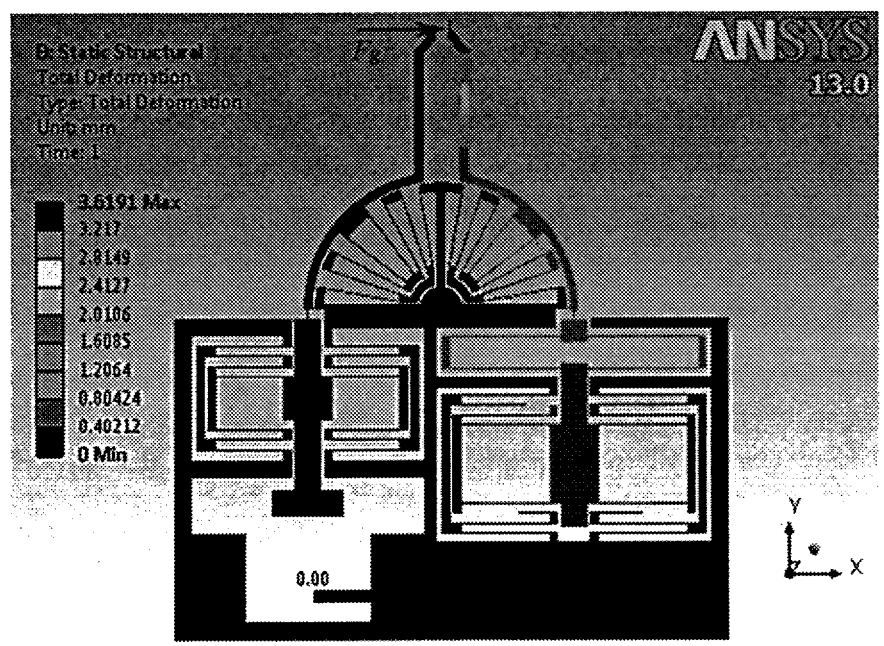
FIG. 5(b) shows deformation results of static structural FEA simulation when a grasping force is applied to an embodiment of the compliant gripper.
Figure 5C:
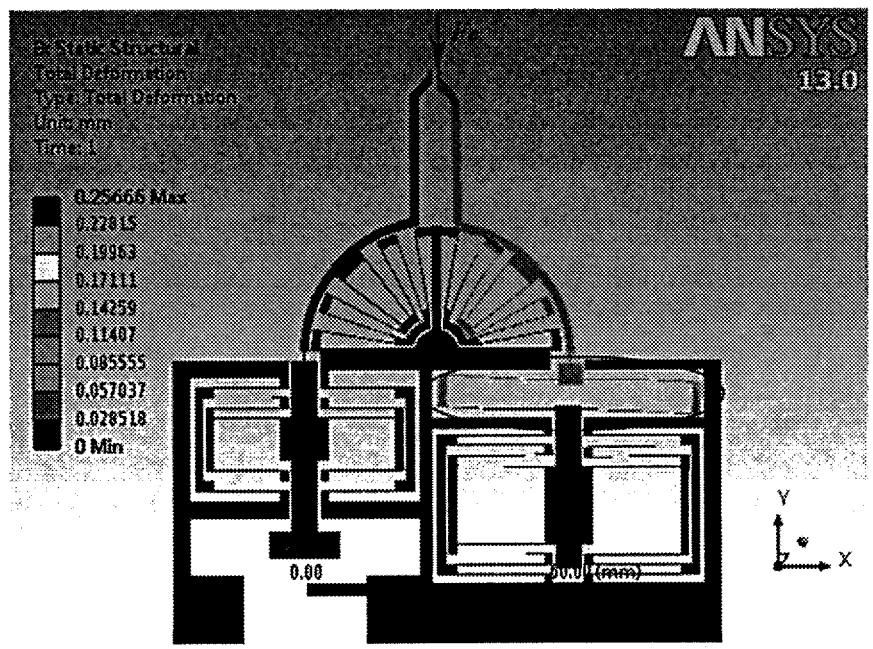
FIG. 5(c) shows deformation results of static structural FEA simulation when an interaction force is applied to an embodiment of the compliant gripper.

When a grasping force ($F_g$=1 N) and an environment interaction force ($F_e$=1 N) are applied at the right tip (4), the resulting deformations from the FEA simulations are shown in FIGS. 5(b) and 5(c), respectively.

It has been shown that the output voltage $V_o$ of a strain gauges is related to the deflection of each leaf flexure μ by:

$$V_o = \frac{3SV_s K_f l \mu}{4Ebh^2} \quad (28)$$

where l and h represent the length and width of leaf flexures, S is the gauge factor of strain gauge (9), b is the thickness of the material, $K_f$ is the linear stiffness of each leaf flexure, and $V_s$ is the source voltage of the quarter-bridge circuit, respectively.

Hence, the ratio of the sensitivities of the two strain gauges (18) can be derived as follows.

$$\eta_{FEA} = \frac{V_1/F_1}{V_2/F_2} = \frac{V_1}{V_2} = \frac{S_1 h_2^2 l_1 K_{f1} \mu_1}{S_2 h_1^2 l_2 K_{f2} \mu_2} \quad (29)$$

To assess the stiffness of the two sensor flexures (1b, 2b), a simulation is carried out by applying a force to the two sensor flexure mechanisms only. By extracting the deflections ($\mu_1$ and $\mu_2$) and stiffnesses ($K_{f1}$ and $K_{f2}$) of the flexures (1b, 2b) in the two sensor mechanisms, the sensitivity ratio is calculated as $\eta_{FEA}$=183.18.

As compared with the FEA result, the analytical model underestimates the sensitivity ratio by 15.5%. This deviation arises from the assumption, as used in the analytical model, which only considers the bending deformations of the leaf flexures. This modeling error can be reduced by taking into account all kinds of deformations of the mechanism.

In addition, with the stiffness values $K_{s1}$ and $K_{s2}$ of the two sensor flexures (1b, 2b) generated by the aforementioned FEA simulations, the force sensing ranges are $F_1$=0.1619 N and $F_2$=0.7847 N, respectively. Compared to these simulation results, the analytical models predict the two ranges with small errors of 2.8% and 2.1%, respectively. For a clear comparison, the results of analytical models and FEA simulations are summarized in Table II.

TABLE II

Gripper Performances Evaluated By Analytical Models And FEA Simulations.

| Performance | Analytical model | FEA simulation | Model error (%) |
|---|---|---|---|
| $d_{in}$ (mm) | ±1.00 | ±1.07 | 6.5 |
| $F_{in}$ (N) | 4.11 | 5.71 | 28.0 |
| F1 (N) | 0.1573 | 0.1619 | 2.8 |

TABLE II-continued

Gripper Performances Evaluated By Analytical Models And FEA Simulations.

| Performance | Analytical model | FEA simulation | Model error (%) |
|---|---|---|---|
| F2 (N) | 0.7683 | 0.7847 | 2.1 |
| η | 154.76 | 183.18 | 15.5 |

TABLE III

FEA Simulation Results of Fatigue-Life Cycles For Producing Different Gripping Ranges

| Gripping range (mm) | Driving displacement (mm) | Life cycle |
|---|---|---|
| ±0.5 | ±0.243 | $1.0000 \times 10^8$ |
| ±1.0 | ±0.486 | $1.0889 \times 10^7$ |
| ±2.0 | ±0.973 | $3.2983 \times 10^4$ |
| ±2.2 | ±1.070 | $1.0057 \times 10^4$ |

Structure Dynamic Performance

Figure 6:
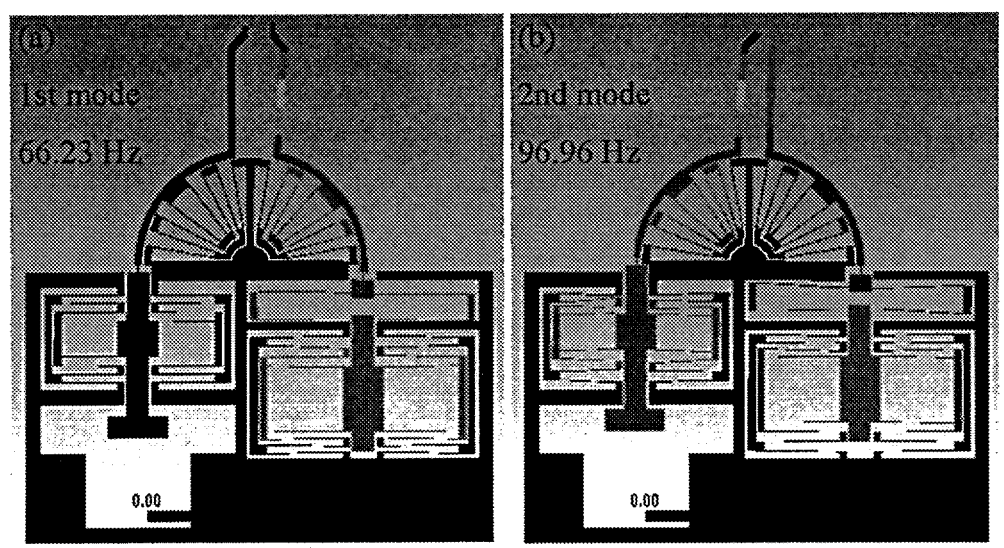
FIG. 6 shows the first-two resonant modes of an embodiment of the gripper structure.

To evaluate the dynamic performance of the gripper structure, a modal analysis simulation was performed. The FEA simulation results of the first-two resonant modes are shown in FIG. 6.

It was observed that the first mode is induced by the motion of the sensing arm (11) with a resonant frequency of 66.23 Hz, and the second resonant mode at 96.96 Hz is mainly attributed to the translation of the actuation arm (10). The simulation results give an intuitive prediction of the resonant mode shapes of the gripper structure.

Fatigue-Life Cycle Analysis

Fatigue analysis was important in the design stage of the gripper. For producing a desired gripping range, the fatigue life of the gripper structure was predicted through FEA simulation. Specifically, by applying a fully-reversed load (corresponding to desired gripping range) to the driving end of the left arm, the stress life analysis was carried out.

By specifying different gripping ranges, the simulation results of the life cycles are shown in Table III. The FEA simulation predicts that, for generating the maximum gripping range of ±2.2 mm, the maximum number of life cycles is about $10^4$ before the fatigue failure of the structure. In addition, the life cycle increases significantly as the gripping range is reduced. For example, a gripping range of less than 1 mm will lead to an approximately infinite life of the gripper structure.

Example Prototype of the Compliant Gripper

Figure 7:
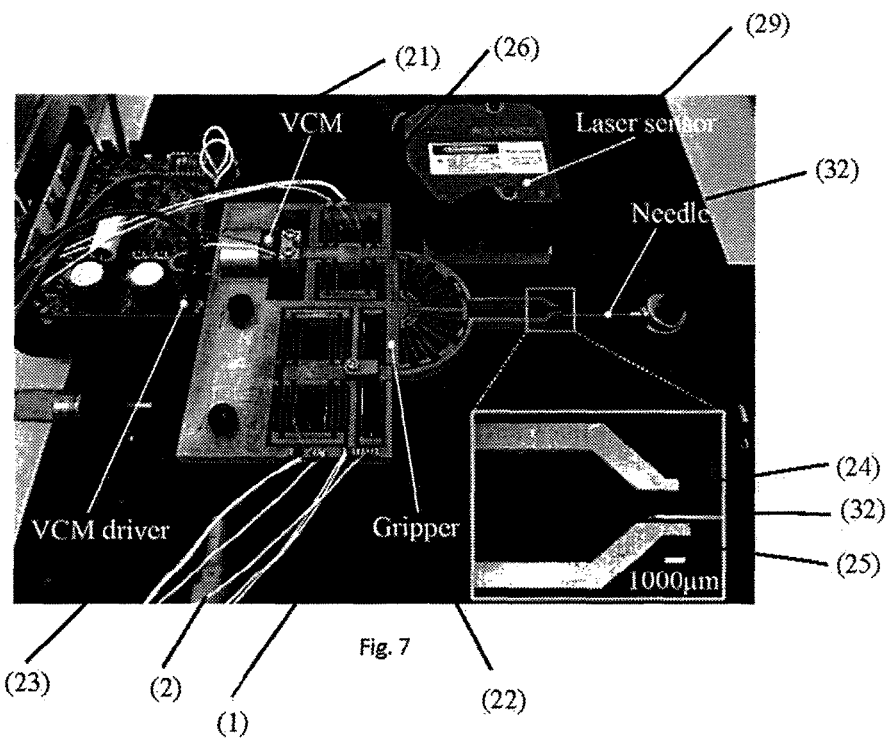
FIG. 7 shows an experimental setup of an example prototype embodiment of the compliant gripper.

An example prototype of a compliant gripper was fabricated from a piece of Al-7075 plate using a wire-electrical discharge machining process. The example prototype is shown in FIG. 7. A VCM (21) (model: NCC04-10-005-1A, from H2W Techniques, Inc.) was chosen to drive the gripper (22). The VCM (21) was able to provide the maximum driving force of 29.2 N with a stroke of 10.2 mm. It was actuated by the NI-9263 analog output module (from National Instruments Corp.) through a VCM driver (23).

For the measurement of the gripper's left tip (24) position, a metal strain gauge (26) (model: SGD-3/350-LY13, from Omega Engineering Ltd.) was used to construct a quarter-bridge circuit. The strain gauge (26) had a gauge factor of 2.1 and a nominal resistance of 350Ω.

To measure the grasping and interaction forces exerted on the right tip (25) of the gripper, the force sensors (1, 2) comprising a piezoresistive strain gauge (1) (model: HU-101A, from Bengbu Heli Sensing System Engineering Co., Ltd.) and a metal strain gauge (2) (model: SGD-3/350-LY13, from Omega Engineering Ltd.), were used respectively. The piezoresistive strain gauge (1) had a dimension of 6 mm×4 mm, a nominal gauge factor of 130, and a nominal resistance of 350Ω. It was more sensitive than the metal strain gauge (2). Each strain gauge forms a quarter Wheatstone-bridge circuit. To measure the quarter-bridge circuit output, the NI-9945 quarter-bridge completion accessory, which contains three 350Ω resistors, is used to complete the circuit.

In addition, a National Instruments (NI) cRIO-9022 real-time (RT) controller combined with a cRIO-9118 reconfigurable chassis (from National Instruments Corp.) was used for implementing the control algorithm. The modules of the NI-9263 analog output and NI-9237 simultaneous bridge input are adopted for the production of analog excitation signals and acquisition of strain-gauge sensor signals, respectively. The NI-9237 input module provides an analog-to-digital conversion resolution of 24-bit. The NI cRIO-9118 chassis contains a FPGA core, and the associated cRIO-9022 RT controller communicates with a personal computer (PC) via the Ethernet port.

For the calibration of strain-gauge position sensor (26), the tip position of the gripper (22) was also measured by a laser displacement sensor (29) (model: LK-H055, from Keyence Corporation) which provided a 25-nm resolution within a 20-mm measuring range. The analog output voltage of the laser sensor signal conditioner is acquired by the NI-9215 A/D module. Additionally, the prototype compliant gripper (22) was programmed using NI LabVIEW software for realizing a real-time control for the gripper system.

Figure 21:
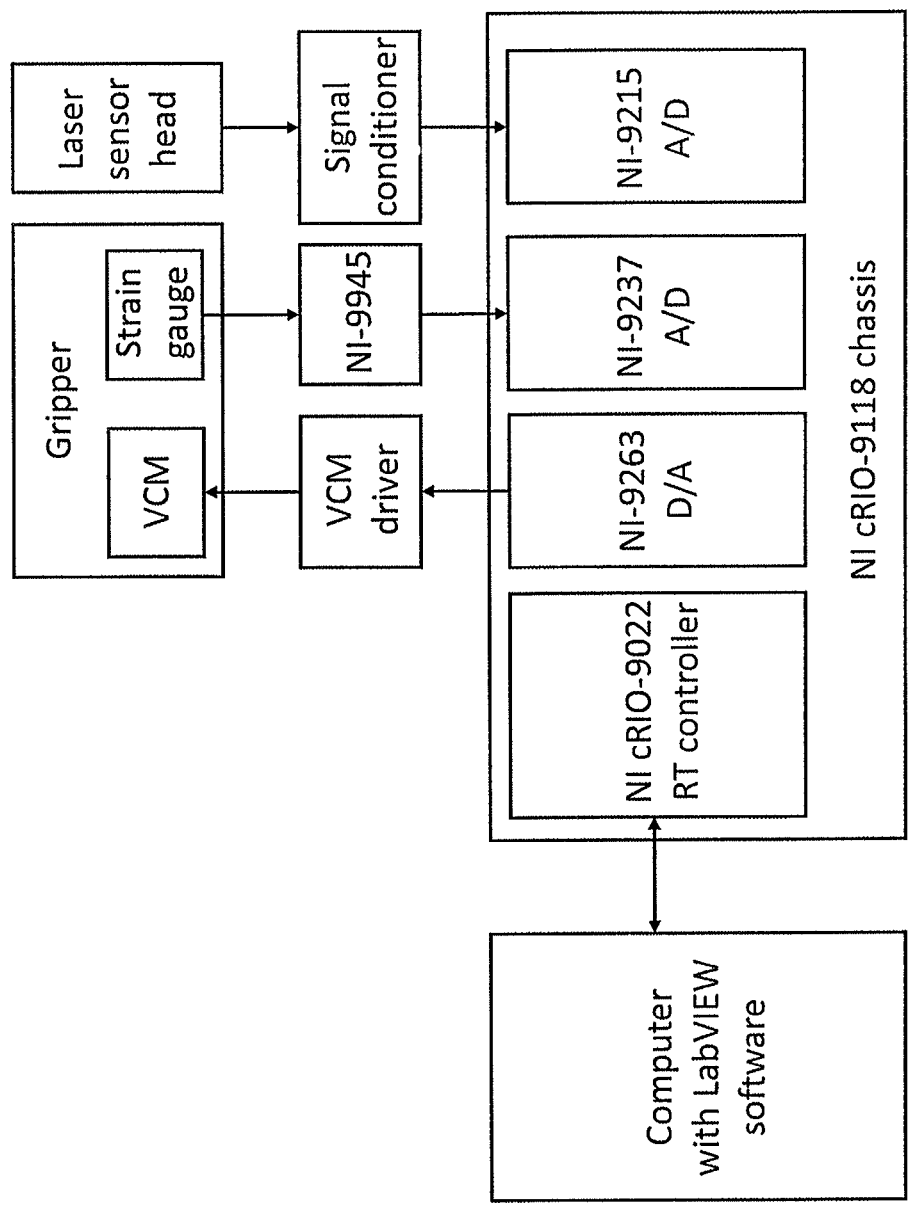
FIG. 21 shows a block diagram of hardware used to calibrate the sensors, to demonstrate the gripper performance, and to achieve a precision position or force control of the gripper.

The block diagram of the hardware is shown in FIG. 21. In this example, an open-loop control is realized to calibrate the sensors and to demonstrate the gripper performance. Moreover, closed-loop control, for example, using PID control algorithm, can be implemented to achieve a precision position or force control of the gripper.

Calibration of Position Sensor

The purpose of the position sensor calibration was to determine its sensitivity so as to convert the output voltage of the strain gauge (26) into a position value. The sensitivity was derived by comparing the strain-gauge (26) output voltage with reference position values. It has been shown that sensitivity can be calibrated by using different input signals such as sinusoidal and square waves. For this example prototype of the present invention, sinusoidal signals were adopted for the calibration of the position sensor (26).

Figure 8A:
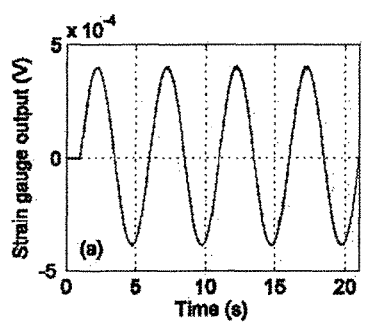
FIG. 8(a) shows output voltage for an example prototype embodiment of the compliant gripper by a strain gauge position sensor.
Figure 8B:
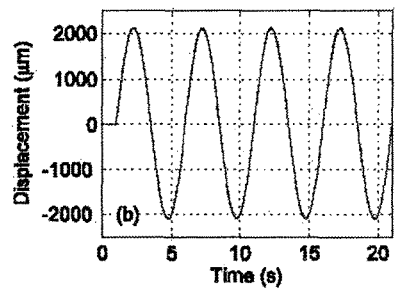
FIG. 8(b) shows output displacement by a laser sensor.

More specifically, a 0.2-Hz sine wave with 1.5-V amplitude was used to drive the VCM (21). The output position of the left tip (24) was measured by the strain gauge (26) and the laser sensor (29) as shown in FIGS. 8(a) and 8(b), respectively. It was observed that the left tip (24) exhibited a displacement range of [−2.18 mm, 2.22 mm] which satisfied an objective of the present invention to have a large gripping range for executing pick-and-place operation of objects (0.15 to 4 mm size) during a micro-assembly task. The rms values of the strain-gauge output voltage and laser sensor output position were $2.74 \times 10^{-4}$ V and $1.46 \times 10^3$ μm, respectively. Thus, a position sensitivity of $1.88 \times 10^{-7}$ V/μm was derived which was used to convert the strain-gauge output voltage into a position value.

Figure 8C:
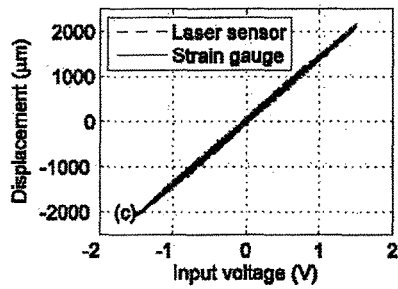
FIG. 8(c) shows input-output relations obtained by a calibrated strain gauge sensor of an example prototype of the compliant gripper and a laser sensor.

With the calibrated strain-gauge position sensor (26), the relationship between the applied voltage and output displacement of the gripper tip (24) is shown in FIG. 8(c). No clear hysteresis was found in the actuation of the left gripper tip (24). Moreover, it was also found that the gripper arm could also be driven using higher voltage inputs for driving the left tip (24) to contact the right tip (25) in the closing operation process.

Figure 8D:
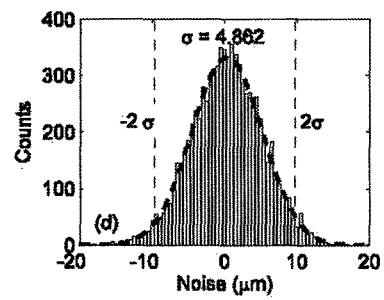
FIG. 8(d) shows a histogram of the strain gauge position sensor noise for an example prototype embodiment of the compliant gripper.

With a zero voltage input, the noise of the strain-gauge position sensor (26) was recorded, as shown in FIG. 8(d). It can be seen that the noise closely follows a normal distribution with a standard deviation (σ) of 4.86 μm. By adopting 2σ as the resolution, the position sensor (26) provides a resolution of 9.72 μm. Thus, the minimum detectable step of the displacement of the left gripper tip (24) is 9.72 μm.

Calibration of Force Sensor

Figure 9A:
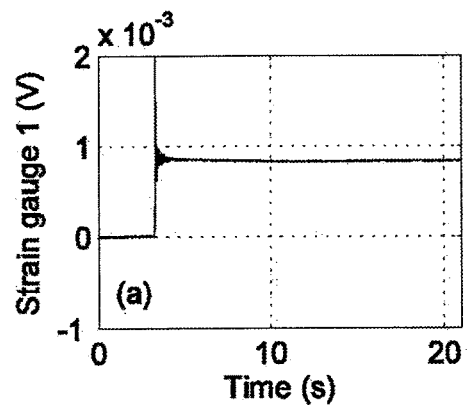
FIG. 9(a) shows output voltage of the strain gauge (1) for an example prototype embodiment of the compliant gripper.
Figure 9B:
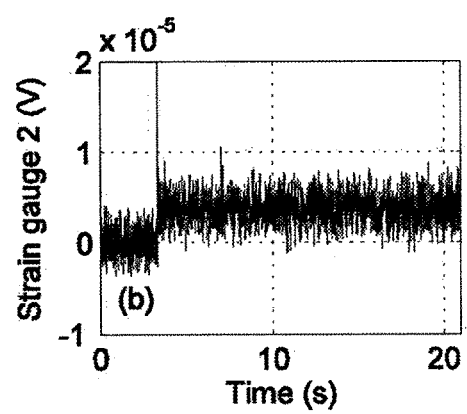
FIG. 9(b) shows output voltage of the strain gauge (2) for an example prototype embodiment of the compliant gripper.

To calibrate the strain-gauge force sensors (1, 2), a hung weight (25 mN) was tied to the right tip of the gripper (25). By removing the support of the weight suddenly, a force was applied to the right tip (25) which induced voltage outputs of the two strain gauges (1, 2), as shown in FIGS. 9(a) and 9(b), respectively. At the steady state, the two strain gauges (1, 2) produce the output voltages of $8.35 \times 10^{-4}$ and $4.12 \times 10^{-6}$ V, respectively. The sensitivity values of the force sensors (1, 2) were derived as $3.34 \times 10^{-5}$ and $1.65 \times 10^{-7}$ V/mN, respectively. This led to a sensitivity ratio of η=202.48. As compared with the simulation results, the experimental results of the sensitivity ratio were 10.5% higher. This discrepancy mainly originated from the manufacturing tolerance of the gripper structure and the difference between the nominal and actual values of the gauge factors.

Figure 9C:
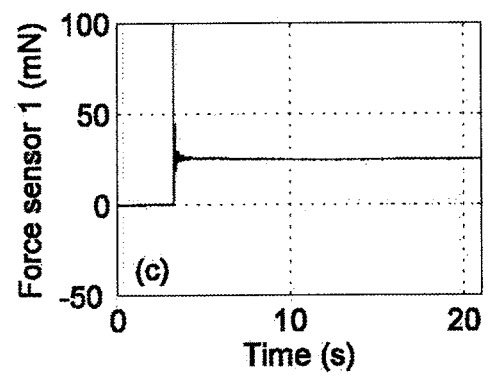
FIG. 9(c) shows output force of the calibrated strain-gauge force sensor (1) for an example prototype embodiment of the compliant gripper.
Figure 9D:
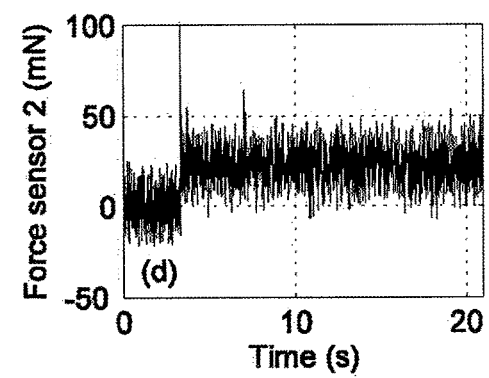
FIG. 9(d) shows output force of the calibrated strain-gauge force sensor (2) for an example prototype embodiment of the compliant gripper.
Figure 9E:
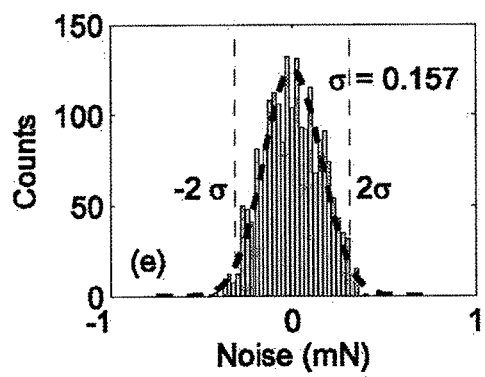
FIG. 9(e) shows a noise histogram of the force sensor (1) for an example prototype embodiment of the compliant gripper.
Figure 9F:
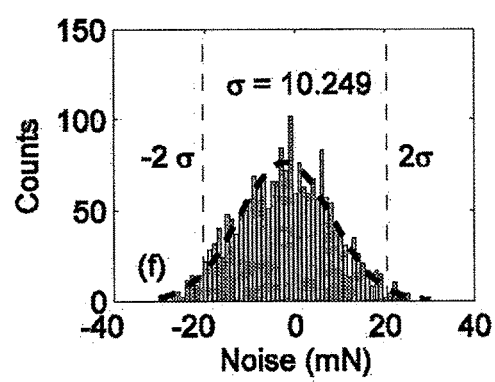
FIG. 9(f) shows a noise histogram of the force sensor (2) for an example prototype embodiment of the compliant gripper.

Force sensitivities were used to convert the voltages into force values, as shown in FIGS. 9(c) and 9(d). In addition, FIGS. 9(e) and 9(f) exhibit the noise histogram of the two force sensors (1, 2) without any force exerted. By adopting 2σ as the resolution, the resolutions of the fine and coarse force sensors (1, 2) were calculated as 0.314 and 20.512 mN, respectively. The resolution ratio of the two sensors (1, 2) was derived as 1/65.3. Thus, resolution in the smaller range was improved by 65.3 times as compared with that in the larger force range.

The noise magnitude of force sensor (2) was mainly influenced by the designed sensitivity ratio as described by equation (29). Thus, using the same strain gauge, the smaller the designed sensitivity ratio, the lower the noise level of the force sensor (2).

The resolution was determined by the analog-to-digital conversion resolution of the hardware (24-bit NI-9237) and the noise. It was found that the resolution ratio is different from the sensitivity ratio of the two force sensors (1, 2). The major reason lied in the different noise levels of the piezoresistive strain gauge (1) and metal strain gauge (2).

Verification of the Force Sensor

Figure 10:
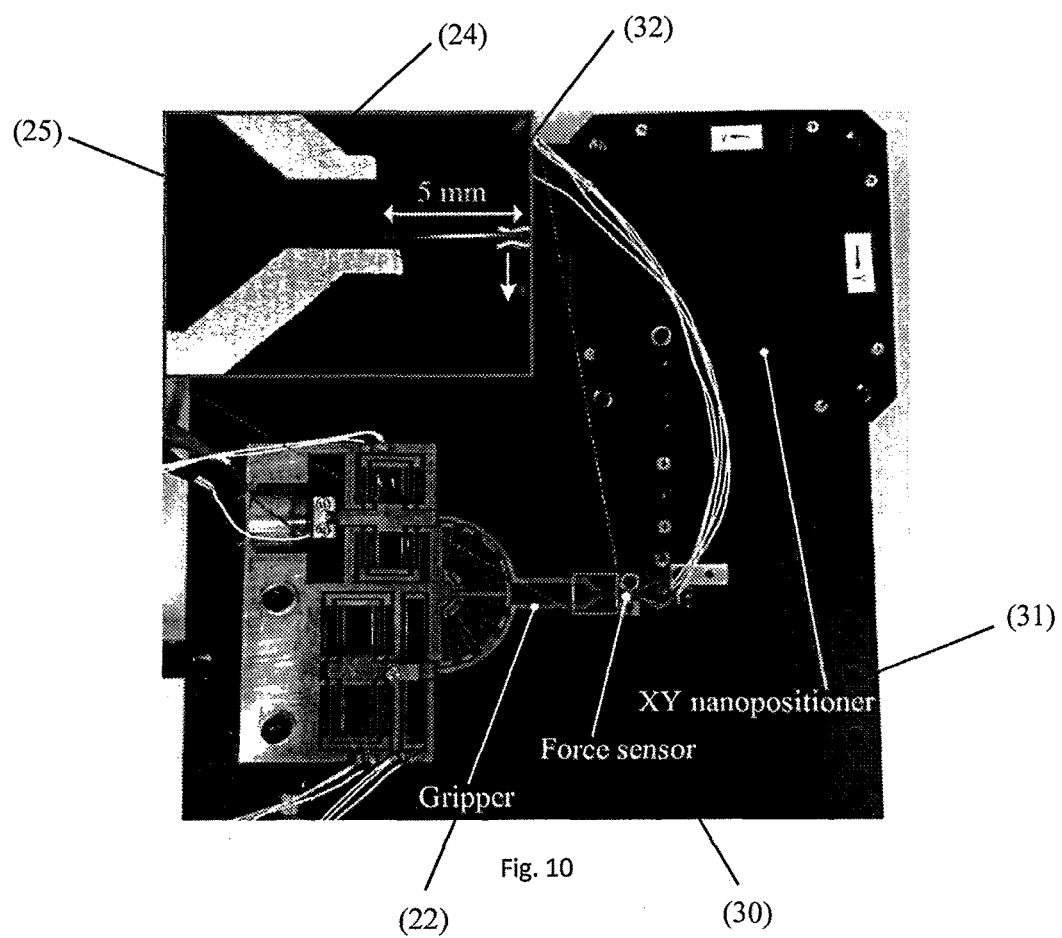
FIG. 10 shows an experimental setup for the verification of strain-gauge force sensors for an example prototype embodiment of the compliant gripper.

The two force sensors (1, 2) were calibrated using a known weight as described above. To verify the strain sensors (1, 2), the sensor outputs were compared with the forces measured using a commercial force sensor (30) (model: AE801, from Kronex Technologies Corp.). An example of the experimental setup is shown in FIG. 10, where the sensor AE801 (30) was mounted on an XY nanopositioner (31) (model: P-734.2CL, from Physik Instrumente Co., Ltd.) and the gripper (22) was fixed on a manual XY stage. Before the example experiment, the gripper (22) was positioned such that the sensing tip (25) was adjacent to the sensor AE801 (30). Then, the sensor AE801 (30) was translated by the nanopositioner (31) and made to contact with the sensing tip (25) of the gripper (22). During the translation of 100 μm displacement, both force sensor AE801 (30) and strain gauge sensors (1, 2) produced force readings.

Figure 11A:
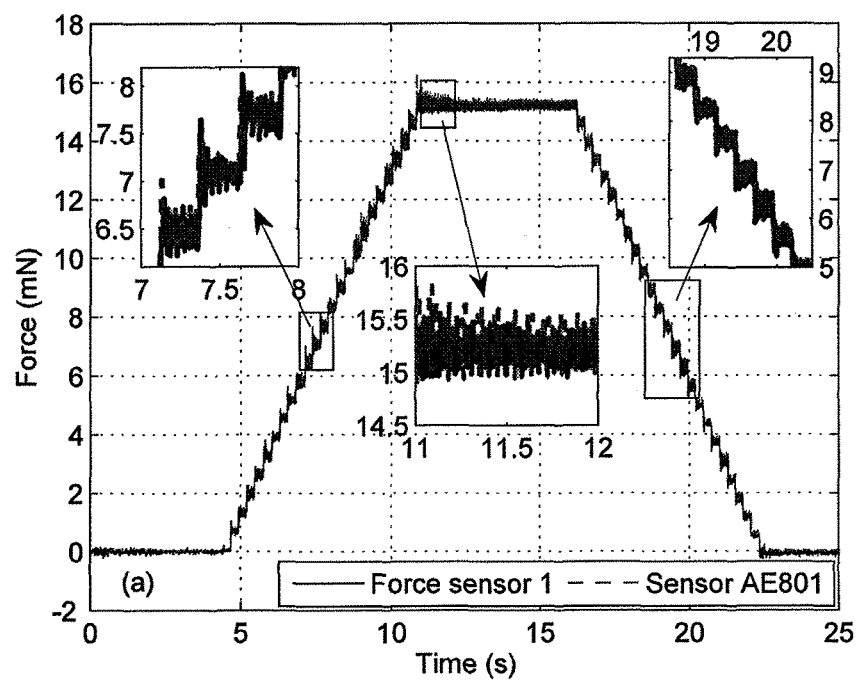
FIG. 11(a) shows a comparison of force sensor (1) and sensor AE801 outputs for an experimental setup of an example prototype of the compliant gripper.
Figure 11B:
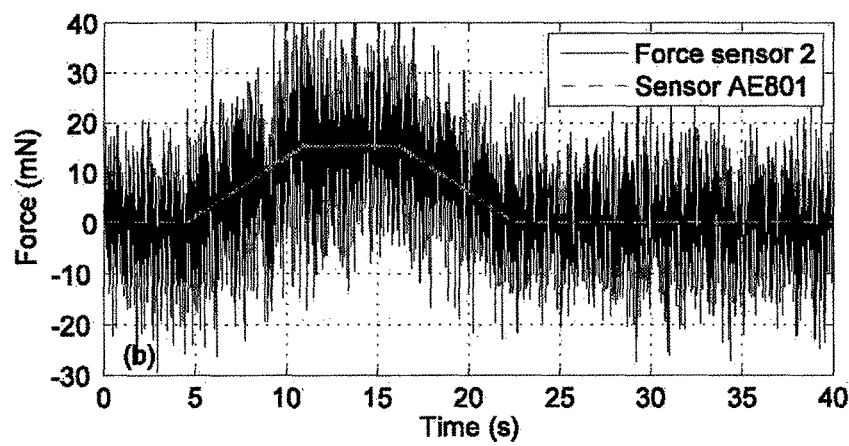
FIG. 11(b) shows a comparison of force sensor (2) and sensor AE801 outputs for an experimental setup of an example prototype of the compliant gripper.

The results are shown in FIG. 11. It is seen that when the nanopositioner (31) translates consecutive steps of 4-μm size in forward and backward directions, the force sensor (1) delivers similar output to the commercial force sensor AE801 (30), as shown in FIG. 11(a). The average of discrepancy between the two sensors' readings is 0.061 mN, which verifies the accuracy of the force sensor (1). Due to the small magnitude of the induced force, the noisier force sensor (2) cannot discriminate the variation steps of the force readings, as depicted in FIG. 11(b). Even so, the force sensor (2) reflected the ascending and descending trends of the force and exhibited the minimum and maximum force values, i.e., 0 and 15.2 mN, during the translation of the nanopositioner (31).

Consistency Testing of the Sensors

Figure 12A:
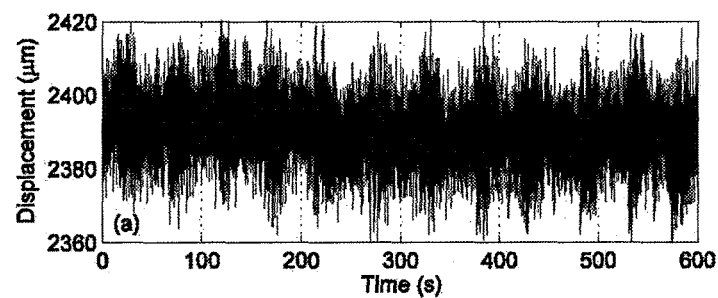
FIG. 12(a) shows consistency testing results for the strain-gauge position sensor for an experimental setup of an example prototype of the compliant gripper.
Figure 12B:
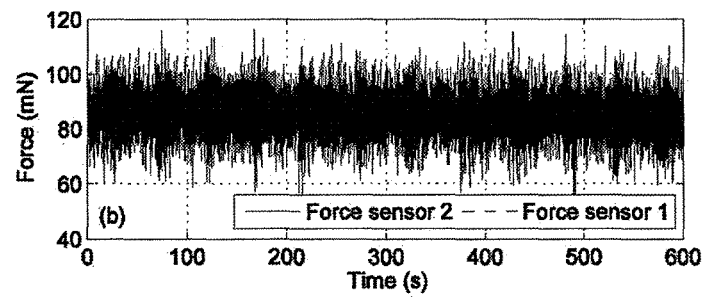
FIG. 12(b) shows consistency testing results for two strain-gauge force sensors for an experimental setup of an example prototype of the compliant gripper.
Figure 12C:
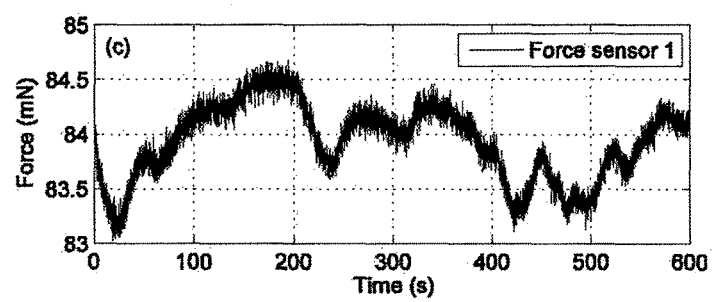
FIG. 12(c) shows consistency testing results for force sensor (1) for an example prototype setup of an embodiment of the compliant gripper.

In order to test the consistency of the position sensor (26) and force sensors (1, 2), the gripper actuation arm was driven using a constant input signal (2 V) to grasp an object. The output signals of the position sensor (26) and two force sensors (1, 2) over 10 minutes are shown in FIG. 12. It is observed that all of the three sensors produce consistent results in the long period of time. As compared with the other two sensors under the same environmental condition (26° C. room temperature), the output of force sensor (1) exhibits a slight fluctuation around 83.9 mN, as shown in FIG. 12(c). The reason lies in that the piezoresistive strain gauge (1) is more sensitive to temperature change. To remedy this issue, a signal conditioning circuit using half- or full-bridge can be employed.

Using the calibrated position (26) and force sensors (1, 2), the grasping and interaction detection performance of the example prototype gripper (22) was tested.

Testing of Grasping Sensing Performance

The grasping performance of the example prototype gripper (22) with integrated position (26) and force sensors (1, 2) was tested by grasping and releasing a micro-needle (32) with a diameter of 300 μm, as shown in the close-up view in FIG. 7. The needle (32) was fixed between the two tips (24, 25) of the gripper (22). The initial distances between the needle (32) and the left tip (24) and right tip (25) were dl and dr, respectively. As can be seen in FIG. 7, the needle (32) was closer to the right tip (25), i.e., dr<dl.

Figure 13A:
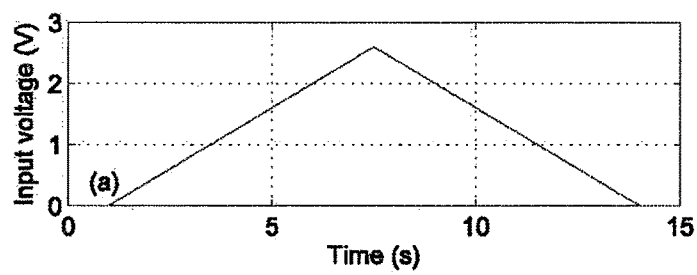
FIG. 13(a) shows grasping performance testing results of an example prototype of the compliant gripper for input voltage over time.
Figure 13B:
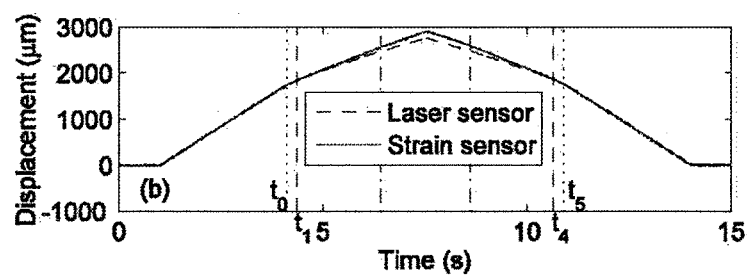
FIG. 13(b) shows grasping performance testing results of an example prototype of the compliant gripper for displacement of the left tip over time.

To carry out the grasping task, a voltage as shown in FIG. 13(a) was used to drive the VCM (21), and the displacement of the left tip (24) was measured by the strain-gauge position sensor (26), as shown in FIG. 13(b). The grasping force was measured by the two strain-gauge force sensors (1, 2), as plotted in FIGS. 13(c) and (d), respectively. It is seen that force sensor (1) saturates in the range around [0, 138.3 mN] which represents the smaller force measurement range of the gripper (22). Within this smaller range, the force can be measured by both sensors, while sensor (2) produced a lower resolution than sensor (1), as discussed earlier. In the force range larger than 138.3 mN, the grasping force is measured by force sensor (2) alone.

Figure 13C:
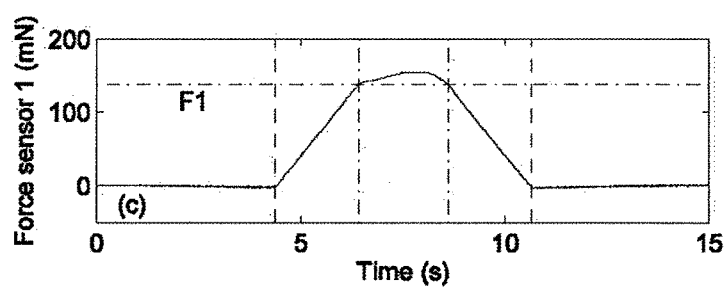
FIG. 13(c) shows grasping performance testing results of an example prototype of the compliant gripper for grasping force measured by force sensor (1) over time.
Figure 13D:
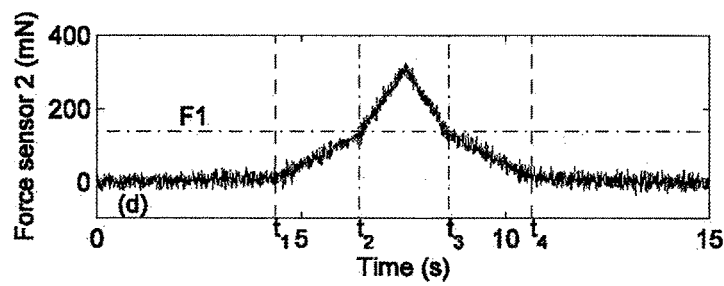
FIG. 13(d) shows grasping performance testing results of an example prototype of the compliant gripper for grasping force measured by force sensor (2) over time.

Referring to FIG. 13(d), it is observed that the right tip (25) of the gripper (22) contacted the needle (32) at time t1. During the time interval between t1 and t2, the grasping force was measured by both force sensor (1) and force sensor (2), although sensor (1) provided a much higher resolution than sensor (2). The fact that the force sensor (2) provided similar readings as force sensor (1) verifies the effectiveness and accuracy of the force sensor calibration process as previously conducted. Between t2 and t3, the sensor (1) was saturated around 138.3 mN, as shown in FIG. 13(c), and the grasping force was measured by sensor (2). In this time interval, the output of sensor (1) may be caused by the movement of the leads attached to the strain gauge.

In addition, the larger force sensing range is tested by applying a sufficient large force to the right arm. Experimental results reveal that the sensor (2) is saturated around 815.2 mN. Thus, the sensor (2) provides a force measuring range of [138.3 mN, 815.2 mN]. The discrepancy between the simulation and experimental results of the two force ranges was mainly caused by the nominal and actual values of the clearances g1 and g2. The force ranges can be tuned by adjusting these two clearances.

Testing of Horizontal Interaction Detection

The performance of the force sensors (1, 2) for detecting the horizontal contact of the gripper (22) with environment was tested by applying a force to the right tip (25). The force was exerted by the micro-needle (32) which was fixed on an XY stage driven by micrometers. In the testing, the relative position of the needle (32) with respect to the gripper tip (25) was adjusted under a microscope by tuning the two micrometers. Then, the contact force Fe was applied to the right tip (25) by manually tuning the micrometers to mimic an interaction with the environment.

Figure 14:
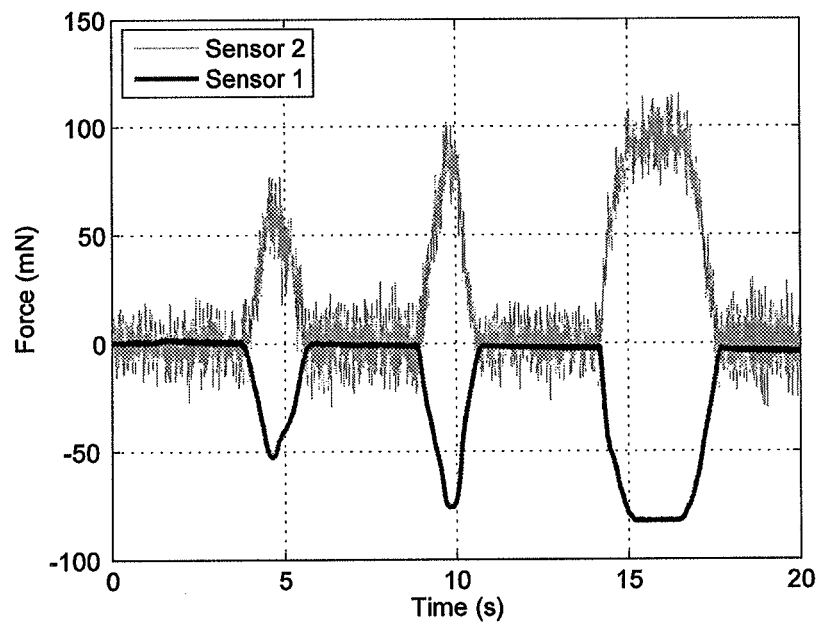
FIG. 14 shows a horizontal interaction force detected by force sensors (1) and (2) for an experimental setup of an example prototype of the compliant gripper.

The contact force was measured by the two force sensors (1, 2) as shown in FIG. 14. It is observed that both sensors (1, 2) can detect the interaction force (Fe) applied to the right tip (25). Different from the grasping force measurement, the sensor (1) produces a negative force signal. The different signs of the sensor (1) outputs can be explained by examining the deformation results as shown in FIGS. 5(b) and 5(c). In the grasping process, the flexures (1b) of force sensor (1) suffer from a common force applied at point B along the y-axis. During the interaction of the right tip (25) with the environment, point B undergoes an x-axis transverse translation in addition to the translation in y-axis direction. The x-axis translation is induced owing to a low transverse stiffness of the sensor flexure (1b). As a result, the four leaf flexures (1b) exhibit a deformation which is different from that in the grasping process. Hence, a negative strain is induced, which leads to a negative output force signal during the horizontal interaction with the environment.

Testing of Vertical Interaction Detection

Figure 15:
FIG. 15 shows an experimental setup for vertical interaction detection of an example prototype of the compliant gripper of the present invention.

Vertical contact detection was tested by fixing the gripper (22) on a micromanipulator (33). FIG. 15 shows the used experimental setup. The gripper (22) was mounted on an XYZ micromanipulator (33) (model: MP-285, from Sutter Instrument Inc.) with an inclined angle of 10° with respect to the horizontal plane. The gripper (22) was lowered to contact the weight-supporting stage of a microbalance (34) (model: HZK-FA110, from Huazhi Scientific Instrument Co. Ltd.). The microbalance (34) offered a mass resolution of 0.1 mg that is equivalent to a force resolution of 0.98 µN. When the gripper (22) was lowered, the right tip (25) makes contact with the plane first because the right tip (25) is longer than the left tip (24). Thus, the vertical contact could be detected by the sensing arm.

Figure 16:
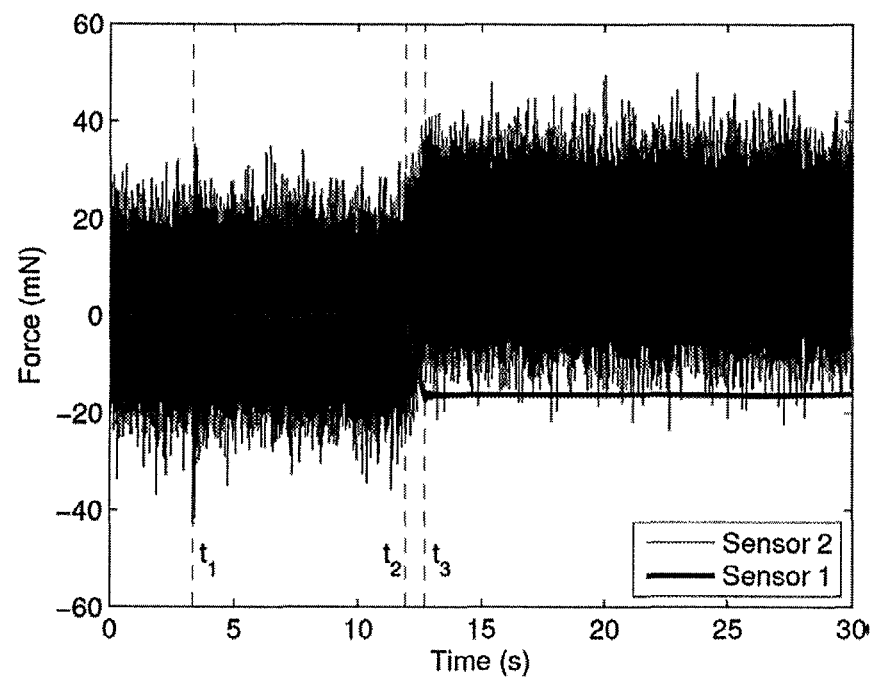
FIG. 16 shows a vertical interaction force detected by force sensors (1) and (2) for an example prototype of the compliant gripper of the present invention.

When the gripper was translated 5.5 mm in the z-axis direction to contact the microbalance (34), the outputs of the two force sensors (1, 2) were recorded as shown in FIG. 16. The gripper (22) kept still before t1. Starting from t1, the gripper (22) was lowered at a constant velocity of 1.7 mm/s. The gripper (22) then contacted the microbalance (34) at t2 and stopped at t3. At the steady state of the contact, the microbalance (34) displayed a mass of 34.4 g, which is equivalent to 337.36 mN.

It was observed that at the start (t1) and stop (t3) time of the translation, force sensor (1) exhibited a clear oscillation in the output signal. The oscillation was from the vibration of the flexible sensor structure, which is induced by the inertia of the gripper (22). Due to a relatively high level of noise of the force sensor (2), the output of sensor (2) was not influenced by the inertial effect. The vibration was introduced by the micromanipulator (33) which started translation with a constant velocity (1.7 mm/s) at t1 and stopped at t3 suddenly. This vibration can be mitigated by a proper trajectory planning of the micromanipulator (33) motion, for example, by starting and stopping with zero acceleration.

By examining the sensor outputs at the steady state, it was found that the sensors (1) and (2) predicted the vertical contact forces of −16.226 mN and 12.809 mN, respectively. The different signs of the two sensor outputs are caused by different deformation directions of the sensing flexures (1b, 2b) when a vertical force is applied. As compared to the microbalance (34) reading, the outputs of sensors (1) and (2) were about 20 and 25 times lower. The reason was that the two sensors (1, 2) were calibrated by applying a grasping force in the gripper plane. When the gripper (22) suffers from a force vertical to the gripper plane, the sensitivities of the two force sensors (1, 2) are much smaller. Thus, although the two force sensors (1, 2) can detect the vertical interaction force, their sensitivities are over 20 times smaller than those of the grasping force and horizontal contact force sensing.

Testing of Dynamic Performance

Generally, the dynamic characteristics of a system can be evaluated by means of impact response, step response, and frequency response. Regarding the actuation arm of the gripper (22), FEA simulation predicted a natural frequency lower than 100 Hz. To excite the resonance of the actuation arm, frequency response approach was employed. Particularly, by fixing the gripper (22) onto the base, a sweep-sine wave with an amplitude of 0.03 V and frequency of interest ranging from 1 to 500 Hz was used to drive the VCM (21).

Figure 17:
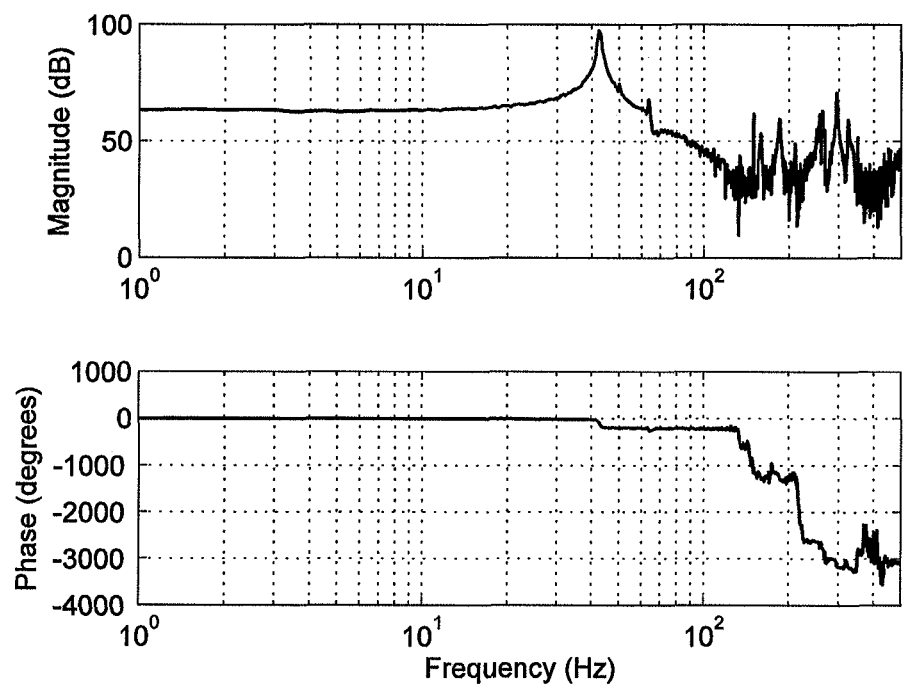
FIG. 17 shows a bode diagram of the frequency response of the actuation arm for an example prototype of the compliant gripper of the present invention.

The displacement response was measured by the strain-gauge position sensor (26). Spectral analysis was then conducted to derive the frequency responses of the gripper (22), as shown in FIG. 17. A resonant peak at 42.66 Hz was observed, which is lower than the value predicted by FEA simulation. The discrepancy between the experimental and simulation results of the resonant frequency mainly arose from the manufacturing tolerance and the added mass of VCM (21), which was not considered in the FEA simulation.

Figure 18A:
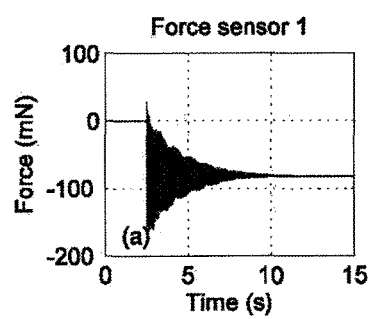
FIG. 18(a) shows negative step responses of the sensing arm obtained by force sensor (1) for an example prototype of the compliant gripper of the present invention.
Figure 18B:
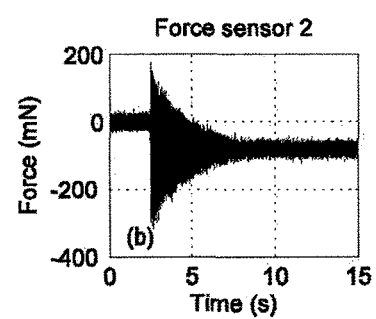
FIG. 18(b) shows negative step responses of the sensing arm obtained by force sensor (2) for an example prototype of the compliant gripper of the present invention.
Figure 18C:
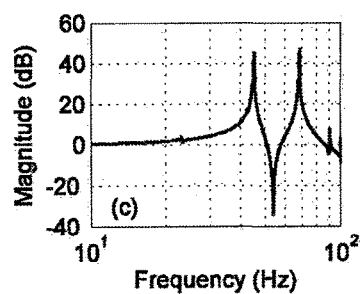
FIG. 18(c) shows magnitudes of frequency responses obtained by force sensor (1) for an example prototype of the compliant gripper of the present invention.
Figure 18D:
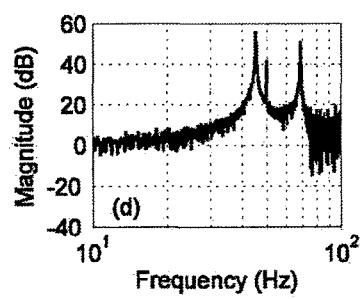
FIG. 18(d) shows magnitudes of frequency responses obtained by force sensor (2) for an example prototype of the compliant gripper of the present invention.

Next, the dynamic performance of the sensing arm of the gripper (22) was tested. The step response approach was employed due to its efficiency and easy implementation. Initially, a mass (8.3767 g) was hung by a wire at the gripper tip (25) of the sensing arm. Due to the gravity (9.807 N/kg) effect, the two strain-gauge force sensors produced readings of 82.15 mN at the steady state. When the wire was cut, the force imposed on the sensing arm was removed suddenly, which induced a negative step response of the right tip (25). The responses captured by force sensors (1) and (2) are shown in FIGS. 18(a) and 18(b), respectively. The magnitudes of frequency responses are obtained by FFT and shown in FIGS. 18(c) and 18(d), respectively. Owing to a higher resolution, the force sensor (1) produced a better result than sensor (2). In addition, both of the two force sensors (1, 2) predicted the first-two resonant frequencies around 45.23 and 68.36 Hz. As compared with FEA simulation result, the experimental result (45.23 Hz) of the first natural frequency was 31.7% lower. This discrepancy was mainly caused by the manufacturing tolerance and the mass of the clearance adjustor, which was not considered in simulation study.

Applications to Pick-Transport-Place in Assembly

To demonstrate the performance of the example prototype of the compliant gripper (22) in assembly application, the gripper (22) was fixed on an XYZ micromanipulator (33). The experimental setup was the same as that shown in FIG. 15. A trajectory was planned to pick, transport, and place a small (M2) screw onto a microbalance (34). The experimental results are shown in FIG. 19.

Figure 19A:
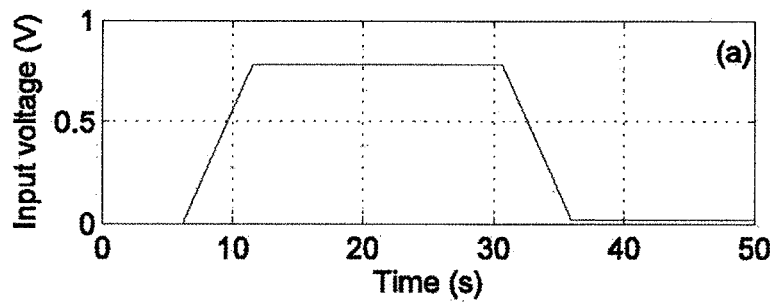
FIG. 19(a) shows input voltage during pick-transport-place of a screw by an example prototype of the compliant gripper.
Figure 19B:
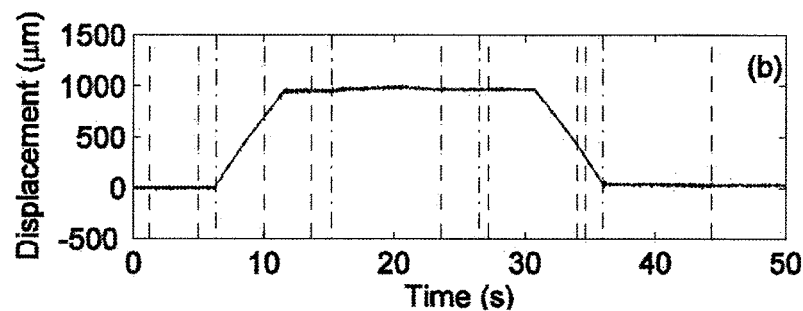
FIG. 19(b) shows displacement of the left tip during pick-transport-place of a screw by an example prototype of the compliant gripper.
Figure 19C:
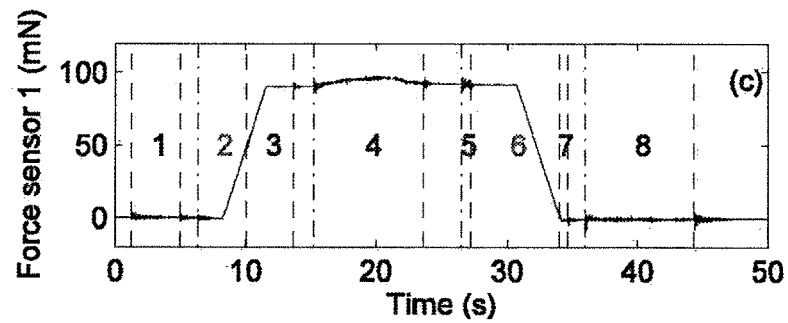
FIG. 19(c) shows grasping force measured by force sensor (1) during pick-transport-place of a screw by an example prototype of the compliant gripper.

Referring to FIG. 19(c), in the time slot 1, the gripper (22) was translated 11 mm in negative z-axis direction at a constant velocity of 2.9 mm/s. Then, the gripper (22) was actuated to grasp the screw in time slot 2. In subsequent time slot 3, the gripper (22) was translated 11 mm upward along z-axis to pick-up the screw. Afterwards, the gripper was translated by 25 mm in x-axis direction at a velocity of 2.9 mm/s in time slot 4 to transport the screw above the microbalance (34). In time slot 5, the gripper (22) was lowered by 2 mm along the negative z-axis direction and the grasped screw contacted the microbalance which caused a reading of the microbalance (34) larger than the screw weight. Because the sensitivities of the force sensors (1, 2) are more than 20 times lower than their normal values, the influence of the vertical force on the sensor outputs were not evident. In time slot 6, the screw was released on the weight-supporting stage of the microbalance (34). The gripper (22) was then translated 2 mm upward along z-axis in time slot 7, and returned to the home position by translating 25 mm along the negative x-axis direction during time slot 8.

Figure 19D:
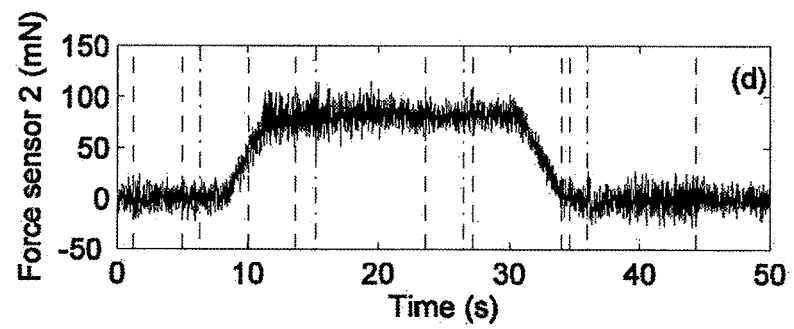
FIG. 19(d) shows grasping force measured by force sensor (2) during pick-transport-place of a screw by an example prototype of the compliant gripper.

As mentioned earlier, due to the inertial effect of the gripper (22), the output of force sensor (1) exhibited an oscillation phenomenon when the XYZ micromanipulator (33) started and stopped moving at a constant velocity as shown in FIG. 19(c). In contrast, the force sensor (2) is not influenced by the inertia due to a larger noise level as depicted in FIG. 19(d). Moreover, FIG. 19(b) reveals that the position sensor output is also not affected by the inertial effect.

As driven by a constant-slope voltage signal as shown in FIG. 13(a), the displacement curve of the left tip (24) of the gripper (22) reveals different slopes during the grasping and releasing operation, as shown in FIG. 13(b). It was found that the displacement increases as the rising of the driving voltage initially. At the moment t1, the right tip (25) contacts the micro-needle as indicated by FIGS. 13(c) and (d). However, the slope of the displacement curve for the left tip (24) begins to change at t0 before t1. This phenomenon reveals that the left tip (24) contacts the needle (32) at t0 first, then the left tip (24) pushes the needle (32) to contact the right tip (25) at t1. Hence, by comparing the left tip (24) displacement at t0 and t1, the initial clearance between the needle (32) and the right tip (25) can be derived as dr=110 μm. In addition, the initial distance between the needle (32) and the left tip (24) can be determined as the displacement at t0, i.e., dl=1810 μm. Furthermore, the initial distance between the two tips (24, 25) of the gripper (22) can be calculated as sum of these two clearances (dl and dr) and the needle diameter, i.e., 2220 μm. In view of this initial distance and the grasping displacement of the left tip (24), the grasping range of approximately [0, 4.4 mm] can be derived, which is consistent with one of the objectives of the present invention. Moreover, by comparing the grasping displacement and the clearance between the two tips, it can be concluded that a driving voltage higher than 1.5 V will cause the contact of the two tips. For this reason, a driving voltage amplitude of 1.5 V is employed in FIG. 8.

Figure 20:
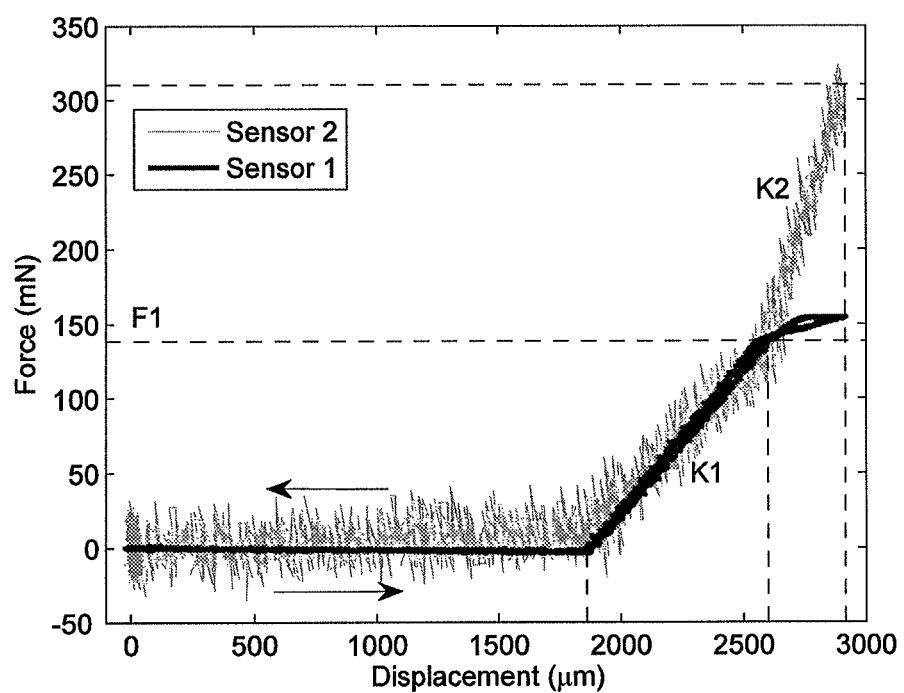
FIG. 20 shows the relationship between the grasping force and displacement for sensors (1) and (2) in an example prototype of the compliant gripper. The different slopes indicate different stiffnesses K1 and K2.

FIG. 13(d) exhibits different slopes of the force curves of sensor (2) which reveals different stiffnesses of the gripper (22) during the two-stage force sensing in the grasping process. The force-displacement relationship is illustrated in FIG. 20. It was found that the grasping and releasing curves overlap each other which means that no hysteresis effect exists. Between t1 and t2, i.e., in the smaller force range, the gripper stiffness can be derived as the slope 0.1869 mN/μm of the best linear fit of the curves produced by both force sensors. Whereas between t2 and the time of peak force, i.e., within the larger force range, the stiffness value is predicted by the sensor 2 as 0.5451 mN/μm. Because of the rigid nature of the grasped object, which exhibits a stiffness value higher than the gripper arms, the stiffnesses can be considered as the stiffness values of the gripper arms.

The grasping and interaction testing experiments show that the force sensor (1) produces different signs of output signals in the two kinds of contact. Thus, whether the contact force is induced by grasping operation or environment interaction can be discriminated by monitoring the sign of the sensor (1) output signal. Specifically, if the force sensor 1 produces a positive force signal with magnitude larger than a specified threshold value, it can be determined that a grasping force is applied between the gripper's right tip and the object. On the other hand, if the force sensor (1) creates a negative force signal with magnitude over a threshold, it can be concluded that the right tip interacts horizontally or vertically with the environment.

The force sensor (1) provides a finer resolution of 0.314 mN within a smaller force measuring range [0, 138.3 mN] while force sensor (2) delivers a coarser resolution of 20.512 mN in a larger measuring range [0, 815.2 mN]. In the smaller range of [0, 138.3 mN], sensors (1) and (2) provide a redundancy of force measuring. The reason for employing sensor (2) for the force measurement in the larger range alone is that the piezoresistive strain gauge is very brittle and is vulnerable to break under a large strain. Whereas the metal strain gauge is able to tolerate a larger strain without damage. Thus, the metal strain gauge is used for the larger-range force detection and the left-tip position sensing.

If L is the length difference between the two tips (24, 25) of the gripper (22) and $\Theta$ is the inclined angle between the gripper plane and the horizontal working plane, the height difference of the tips (24, 25) can be calculated by $L \sin \Theta$ which limits the size of the smallest object to be grasped. In an example embodiment, the right tip (25) is 0.8-mm longer than the left tip (24) which enables the detection of environmental forces exerted on the right tip (25) in the y-axis and z-axis directions during the assembly process. With an inclined angle of $\Theta=10°$ relative to the horizontal plane, the height difference of the two tips is 138.92 μm. Thus, the gripper (22) cannot grasp the objects with height less than 138.92 μm under such a fixing angle. In order to grasp smaller objects, the inclined fixing angle $\Theta$ or the length difference L between the two gripper tips can be reduced.

The gripper (22) is designed for the pick-and-place of objects with the size of 0.15 to 4 mm in micro-assembly applications. For a reliable operation, the force sensing capability is important to guarantee that an appropriate grasp force is applied on the object. The two-stage force sensing is necessary for measuring the grasp force when picking different sized objects. Specifically, the smaller resolution in the smaller measuring range of [0, 138.3 mN] is used to detect the grasp force of smaller objects, while the larger resolution in the larger measuring range of [138.3 mN, 815.2 mN] is employed to measure the grasp force for bigger objects.

The x-axis gripping force (Fg) and y-axis interaction force (Fe) in orthogonal directions are detected by the same set of force sensors which measure the displacement along the y-axis. The force sensors are designed to detect the two-axial forces sequentially. If the gripping and interaction forces are applied at the same time, the force sensors cannot distinguish the forces separately. In a micro-assembly process, the force sensors can be used as interaction force sensors to detect a contact occurrence before the gripping operation. Afterwards, the force sensors of the gripper (22) can be used as gripping force sensors to measure gripping force.

The force sensing in the grasp plane is the main working mode of the force sensors owing to the higher sensitivity. The force sensors exhibit a lower sensitivity for the z-axis force sensing, which is 20 times lower than the x- and y-axes sensitivities.

The quarter Wheatstone-bridge circuit is adopted as the signal conditioner of strain-gauge output in this example. The sensitivities of the strain-gauge sensors can be further enhanced by constructing a half- or full-bridge circuit. In addition, the force sensor (2) exhibits considerable noise which demands a suitable filtering technique. In this example, to have a fair comparison of the sensitivities of the two force sensors, the raw data of sensor outputs are used and no filters are adopted. In the future, appropriate noise filters can be used to reduce the sensor noises.

In this example prototype of the compliant gripper, the gripper (22) was developed in macro-scale to explain the concepts of the present invention. However, the gripper (22) can also be implemented in micro-scale. For example, a simplified version of the reported gripper has been fabricated into MEMS micro-scale.

In view of the forgoing, the present invention relates to the design, analysis, fabrication, and experimental testing of a new compliant gripper with integrated strain-gauge position and force sensors. The gripper provides a grasping range of 4.4 mm with a displacement resolution of 9.724 μm. The dual-sensitivity force sensors produce different resolutions of 0.314 mN and 20.512 mN within two ranges of [0, 138.3 mN] and [138.3 mN, 815.2 mN], respectively, which are helpful to measure the grasp forces of objects with various sizes in pick-and-place operation. The grasping range and force sensing ranges can be adjusted to cater for different requirements. Experimental results demonstrate that the force sensors are able to detect interaction forces and grasping forces sequentially. The pick-transport-place of a small screw demonstrates the effectiveness of the developed gripper in assembly application. Therefore, the results validate the concept and design of the new compliant gripper with dual-sensitivity, dual-range force sensors for both grasping and interaction force sensing dedicated to micro-assembly applications.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

What is claimed is:

1. A gripper assembly comprising:
   (a) an actuation arm comprising an actuation arm tip;
   (b) a sensing arm comprising a sensing arm tip;
   (c) a rotary actuation arm flexure bearing operatively connected to the actuation arm;
   (d) an actuation arm guiding flexure operatively connected to the actuation arm bearing;
   (e) driving means for imparting a driving displacement along a y-axis direction to the actuation arm bearing through the actuation arm guiding flexure, the actuation arm flexure bearing being configured to convert the driving displacement in the y-axis direction into displacement of the actuation tip in an x-axis direction;
   (f) a rotary sensing arm flexure bearing operatively connected to the sensing arm and being configured to convert displacement of the sensing arm tip in the x-axis direction into displacement in the y-axis direction; and
   (g) first and second force sensor flexures operatively linked to the rotary sensing arm flexure bearing in series and being configured to detect y-axis displacement of the sensing arm tip caused both by contact of the sensing arm tip with environment and by conversion of x-axis displacement of the sensing arm tip by the rotary sensing arm flexure bearing whereby the first and second force sensor flexures can collectively detect both a grasping force $F_g$ of the gripper and an interaction force $F_e$ caused by the gripper interacting with the environment, wherein the first force sensor flexure has a lower stiffness than the second force sensor flexure and a measuring range that is smaller than that of the second force sensor flexure such that the first force sensor flexure can measure an initial displacement of the sensing arm tip in a lower measuring range with a first sensitivity and the second force sensor flexure assembly can measure a further displacement of the sensing arm tip in a larger measuring range with a second sensitivity that is lower than the first sensitivity.

2. The gripper assembly of claim 1, wherein the actuator guiding flexure is linear and has a plurality of position flexures, and wherein the gripper assembly further comprises a strain gauge position sensor connected to the position flexures of the actuator guiding flexure.

3. The gripper assembly of claim 2, wherein the strain gauge position sensor is configured to measure a disposition of the actuator tip.

4. The gripper assembly of claim 1, wherein the sensing tip extends higher in the y-axis direction than the actuation tip whereby the sensing tip can contact the environment before the actuation tip.

5. The gripper assembly of claim 1, wherein each of the actuation arm guiding flexure, the rotary actuation arm flexure, the rotary sensing arm flexure and the first and second force sensor flexures is a right circular, right angle, corner-filled, elliptical, or leaf flexure.

6. The gripper assembly of claim 5, wherein each of the actuation arm guiding flexure, the rotary actuation arm flexure, the rotary sensing arm flexure and the first and second force sensor flexures is a leaf flexure.

7. The gripper assembly of claim 1, wherein the driving means comprises a voice coil motor.

8. The gripper assembly of claim 1, wherein the first force sensor flexure comprises four fixed-guided force flexures which experience identical deformation due to having the same dimensions, and wherein the second force sensor flexure comprises two compound parallelogram force flexures.

9. The gripper assembly of claim 8, wherein each of the first and second force sensors comprises a strain gauge.

10. The gripper assembly of claim 9, wherein the first force sensor flexure is a piezo-resistive strain gauge and the second force sensor is a metal strain gauge.

11. The gripper assembly of claim 1, wherein the first force sensor flexure comprises a first stopper that constrains the measuring range of the first force sensor flexure, and the second force sensor flexure comprises a second stopper that constrains the measuring range of the second force sensor flexure thereby providing a two-stage sensing scheme with the first force sensor having a higher sensitivity in a smaller force measurement range, and the second force sensor having a lower sensitivity in a larger force measurement range.

12. The gripper assembly of claim 11, wherein the first and second force sensor flexures are configured such that, in the smaller force measurement range [0, F1], deformation is experienced by both the first and second force sensor flexures, and in the larger force measurement range [F1, F2], flexure deformation is experienced by only the second force sensor flexure.

13. The gripper assembly of claim 12, wherein the first force sensor flexure has a resolution of 0.314 mN within the smaller force measuring range of [0, 138.3 mN] and the second force sensor flexure has a resolution of 20.512 mN in the larger force measuring range of [0, 815.2 mN].

14. The gripper assembly of claim 1, wherein a driving displacement of the driving means, a driving distance between a driving point A and a rotation center O of the rotary actuation arm flexure and a length of the actuation arm are respectively selected such that a range of displacement of the actuation tip is over 4 mm.

15. The gripper assembly of claim 14, wherein the range of displacement of the actuation tip is from 0 to 4.4 mm.

16. The gripper assembly of claim 1, wherein the gripper assembly comprises Al-7075 alloy material.

17. The gripper assembly of claim 1, wherein the x-axis direction and y-axis direction are perpendicular to each other.

18. A method of manipulating an object comprising
providing the gripper assembly of claim 1;
moving the gripper assembly toward the object,
actuating the gripper assembly to grasp the object,
moving the gripper assembly upward along a positive z-axis direction to pick-up the object,
moving the gripper assembly in a positive x-axis direction at a constant velocity to transport the object above a desired location,
lowering the gripper assembly along the negative z-axis direction,
releasing the object at a desired location,
moving the gripper assembly upward along a positive z-axis direction, and
returning the gripper to a home position by moving the gripper along a negative x-axis direction.

* * * * *